US007836431B2

(12) United States Patent
Xu

(10) Patent No.: US 7,836,431 B2
(45) Date of Patent: Nov. 16, 2010

(54) PIPELINING OF INPUT/OUTPUT PARAMETERS BETWEEN APPLICATION TESTS WRITTEN IN A DBMS PROCEDURAL LANGUAGE

(75) Inventor: Minyi Xu, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 966 days.

(21) Appl. No.: 11/656,586

(22) Filed: Jan. 22, 2007

(65) Prior Publication Data

US 2008/0178043 A1 Jul. 24, 2008

(51) Int. Cl.
*G06F 9/44* (2006.01)

(52) U.S. Cl. ........................ 717/124; 717/126; 717/168

(58) Field of Classification Search ................. 702/119; 705/8; 707/758, 761, 763; 714/46, 703; 717/100, 106, 110, 115, 121, 124, 126, 168, 717/169
See application file for complete search history.

(56) References Cited

U.S. PATENT DOCUMENTS 7,603,658 B2 * 10/2009 Subramanian et al. ...... 717/126
2004/0128652 A1 * 7/2004 Mandava et al. ............ 717/124
2008/0222608 A1 * 9/2008 Gartner et al. ............. 717/124

OTHER PUBLICATIONS

U.S. Appl. No. 10/991,607, filed Nov. 17, 2004 by Sowmya Subramanian et al.
U.S. Appl. No. 10/991,608, filed Nov. 17, 2004 by Sowmya Subramanian et al.
U.S. Appl. No. 10/991,883, filed Nov. 17, 2004 by Sowmya Subramanian et al.

* cited by examiner

*Primary Examiner*—Greta L Robinson
*Assistant Examiner*—I Uddin
(74) *Attorney, Agent, or Firm*—Silicon Valley Patent Group LLP; Omkar Suryadevara

(57) ABSTRACT

To implement pipelining, data from a first test written in a DBMS procedural language (such as PL/SQL) is automatically passed to a second test which may or may not be in the same language. A user creates a container test to identify names of the two tests, and adds one or more procedure(s) with predetermined name(s), to identify dependencies between the tests. In the first test, to supply data for the second test, the user includes one or more additional procedure(s) of predetermined name(s), to support an interface to a runtime data store. The second test reads data from the runtime data store. In certain embodiments, an adapter extracts test names from the container test and uses each name to create an object for each test, and during execution of methods in each object a database call is issued.

30 Claims, 28 Drawing Sheets

```
package oracle.apps.jtf.regress.qatool.testcase;
import javax.servlet.http.HttpServletRequest;

public class JTFGeneralPreferenceTest extends QATestImpl {

  private String o_langCode = "";
  public JTFGeneralPreferenceTest() {

     /* Step 0: Set test information */
     testName = "General Preference";
    // Please use a readable name since it will be displayed.
  }

  public boolean runTest() {
     String langStr;
     try {
        langStr = GeneralPreference.getDefaultLanguage();
     } catch (Exception e) {
     }
     o_langCode = langStr;
     return true;
  }

  public Hashtable getOutputValues() {
     Hashtable result = new Hashtable();
     result.put("LanguageCode", o_langCode);
     result.put("Username", getInputValue("Username"));
     return result;
  }
}
```

FIG. 1C
(prior art)

Figure 1D:
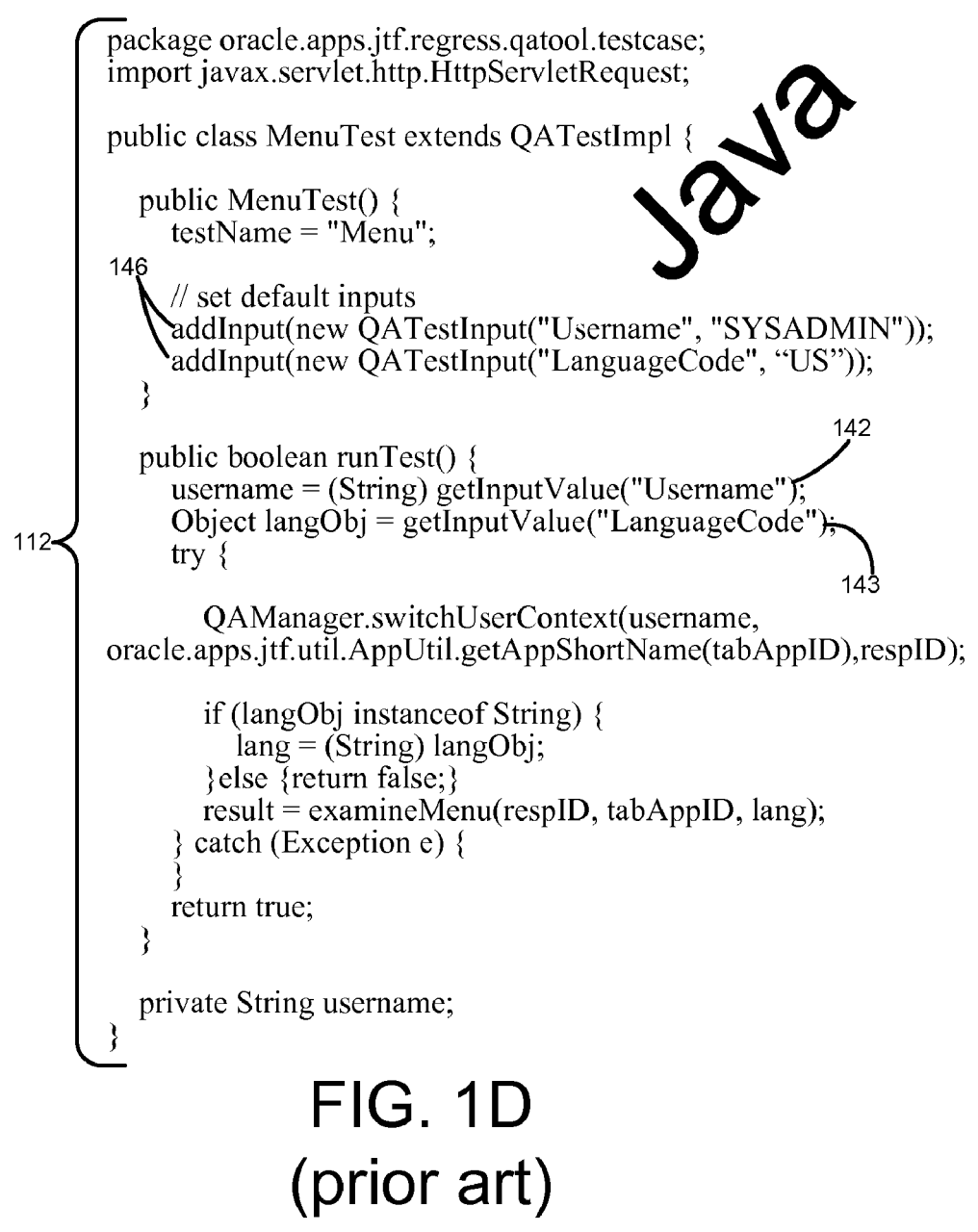

```
package oracle.apps.jtf.regress.qatool.testcase;
import javax.servlet.http.HttpServletRequest;

public class MenuTest extends QATestImpl {

   public MenuTest() {
      testName = "Menu";

      // set default inputs
      addInput(new QATestInput("Username", "SYSADMIN"));
      addInput(new QATestInput("LanguageCode", "US"));
   }

   public boolean runTest() {
      username = (String) getInputValue("Username");
      Object langObj = getInputValue("LanguageCode");
      try {

         QAManager.switchUserContext(username,
oracle.apps.jtf.util.AppUtil.getAppShortName(tabAppID),respID);

         if (langObj instanceof String) {
            lang = (String) langObj;
         }else {return false;}
         result = examineMenu(respID, tabAppID, lang);
      } catch (Exception e) {
      }
      return true;
   }

   private String username;
}
```

```
package oracle.apps.jtf.regress.qatool.testcase;
import javax.servlet.http.HttpServletRequest;

public class UserTest extends QATestImpl {

   private static final String[] dependencies =

{"oracle.apps.jtf.regress.qatool.testcase.JTFGeneralPreferenceTest",
         "oracle.apps.jtf.regress.qatool.testcase.MenuTest"};

   public UserTest() {
      testName = " User Setup";

      /* Set dependency information (if any) */
      dependentClassNames = dependencies;
      this.isDependencyPipelined = true;
   }

   public boolean runTest() {
      return true;
   }

}
```

147 144 145

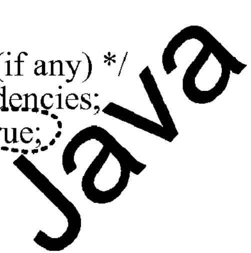

FIG. 1E
(prior art)

```
-- SET VERIFY OFF
WHENEVER SQLERROR EXIT FAILURE ROLLBACK;

CREATE OR REPLACE PACKAGE BODY INV_DIAG_QAPACKAGE AS
/* $Header: inv_test_pls_b.pls 115.2 2005/08/13 01:16:21 minxu noship $ */
 ------------------------------------------------------------
 -- procedure to report test name back to framework
 ------------------------------------------------------------
 PROCEDURE getTestName(str OUT NOCOPY VARCHAR2) IS
 BEGIN
  str := 'Inv Test';
 END getTestName;
 ------------------------------------------------------------
 -- procedure to report name back to framework
 ------------------------------------------------------------
 PROCEDURE getComponentName(str OUT NOCOPY VARCHAR2) IS
 BEGIN
  str := 'Inv Tests';
 END getComponentName;
 ------------------------------------------------------------
 -- procedure to report test description back to framework
 ------------------------------------------------------------
 PROCEDURE getTestDesc(str OUT NOCOPY VARCHAR2) IS
 BEGIN
  str := 'Inv test to test core API calls';
 END getTestDesc;
 ------------------------------------------------------------
 -- procedure to provide/populate default parameters for test case.
 ------------------------------------------------------------
 PROCEDURE getDefaultTestParams(defaultInputValues OUT NOCOPY JTF_DIAG_INPUTTBL)
IS
  tempInput JTF_DIAG_INPUTTBL;
 BEGIN
  tempInput := JTF_DIAGNOSTIC_ADAPTUTIL.initinputtable;
  tempInput :=
JTF_DIAGNOSTIC_ADAPTUTIL.addInput(tempInput,'USERNAME','SYSADMIN');
  defaultInputValues := tempInput;
 EXCEPTION
  when others then
  defaultInputValues := JTF_DIAGNOSTIC_ADAPTUTIL.initinputtable;
 END getDefaultTestParams;
 ------------------------------------------------------------
 -- procedure to report test mode back to the framework
 ------------------------------------------------------------
 FUNCTION getTestMode RETURN NUMBER IS
 BEGIN
  return(2);
 END getTestMode;
 ------------------------------------------------------------
 -- procedure to initialize test datastructures
 -- executes prior to test run
 ------------------------------------------------------------
 PROCEDURE init IS
 BEGIN
  -- test writer could insert special setup code here
  null;
 END init;
```

FIG. 1G (prior art)

```
----------------------------------------------------------
-- procedure to cleanup any  test datastructures that were setup in init
--  procedure call executes after test run
----------------------------------------------------------
PROCEDURE cleanup IS
BEGIN
 -- test writer could insert special cleanup code here
 NULL;
END cleanup;
----------------------------------------------------------
-- procedure to execute the PLSQL test
-- the inputs needed for the test are passed in and a report object and CLOB are -- returned.
----------------------------------------------------------
PROCEDURE runtest(inputs IN  JTF_DIAG_INPUTTBL,
                  report OUT NOCOPY JTF_DIAG_REPORT,
   161            reportClob OUT NOCOPY CLOB) IS
  reportStr   LONG;          -- REPORT
  sql_text    VARCHAR2(200);  -- SQL select statement
  c_username  VARCHAR2(50);   -- accept input for username
  statusStr   VARCHAR2(50);   -- SUCCESS or FAILURE
  errStr      VARCHAR2(4000); -- error message
  fixInfo     VARCHAR2(4000); -- fix tip
  isFatal     VARCHAR2(50);   -- TRUE or FALSE
  num_rows       NUMBER;
 BEGIN
  JTF_DIAGNOSTIC_ADAPTUTIL.setUpVars;  -- must have
  -- accept input
  c_username := JTF_DIAGNOSTIC_ADAPTUTIL.getInputValue('USERNAME',inputs);

  -- html formatting
  JTF_DIAGNOSTIC_ADAPTUTIL.addStringToReport('@html');
  JTF_DIAGNOSTIC_COREAPI.Show_Header(null, null); -- add html css
163
  -- for dummy testing, simply put status as 'SUCCESS'
  -- successful test will not show error message and fix info in report
  statusStr := 'SUCCESS';
  errStr := 'Test failure message displayed here';
  fixInfo := 'Fixing the test suggestions here';
  isFatal := 'FALSE';
  -- construct report
 report := JTF_DIAGNOSTIC_ADAPTUTIL.constructReport(statusStr,errStr,fixInfo,isFatal);
 reportClob := JTF_DIAGNOSTIC_ADAPTUTIL.getReportClob;
 END runTest;   164

END INV_DIAG_QAPACKAGE;
/

commit;
-- exit;
```

PL/SQL

FIG. 1H (prior art)

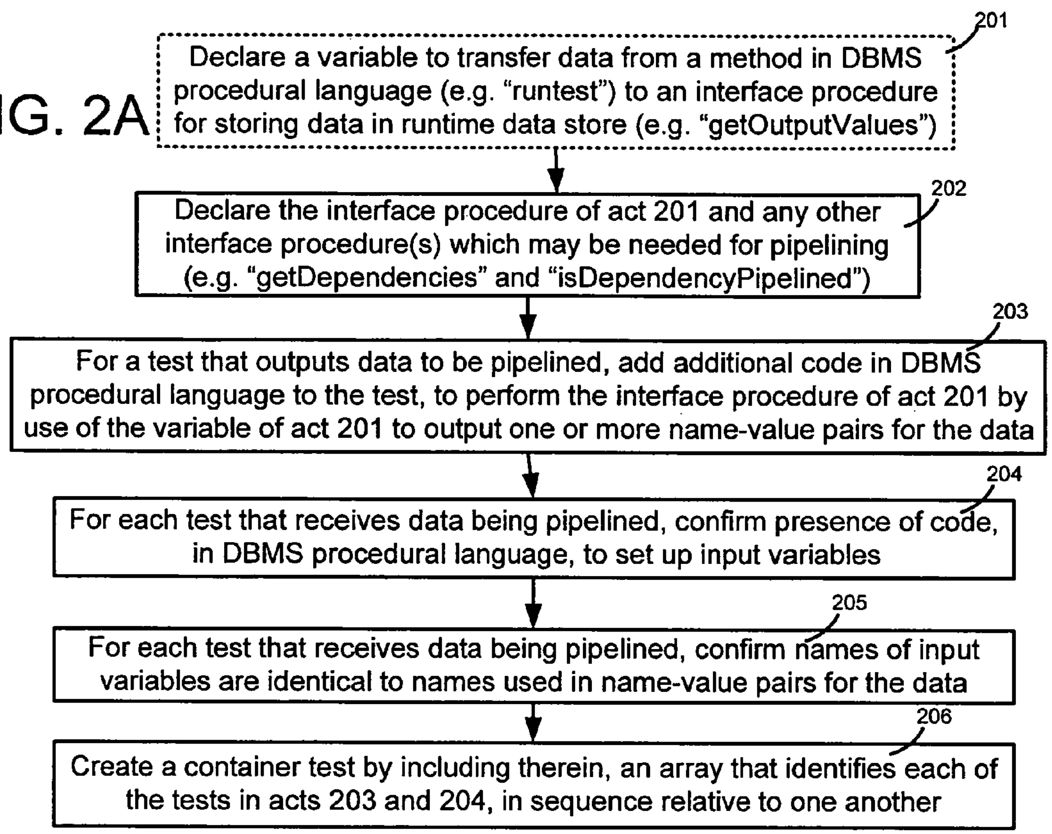
FIG. 2A
201
Declare a variable to transfer data from a method in DBMS procedural language (e.g. "runtest") to an interface procedure for storing data in runtime data store (e.g. "getOutputValues")
202
Declare the interface procedure of act 201 and any other interface procedure(s) which may be needed for pipelining (e.g. "getDependencies" and "isDependencyPipelined")
203
For a test that outputs data to be pipelined, add additional code in DBMS procedural language to the test, to perform the interface procedure of act 201 by use of the variable of act 201 to output one or more name-value pairs for the data
204
For each test that receives data being pipelined, confirm presence of code, in DBMS procedural language, to set up input variables
205
For each test that receives data being pipelined, confirm names of input variables are identical to names used in name-value pairs for the data
206
Create a container test by including therein, an array that identifies each of the tests in acts 203 and 204, in sequence relative to one another

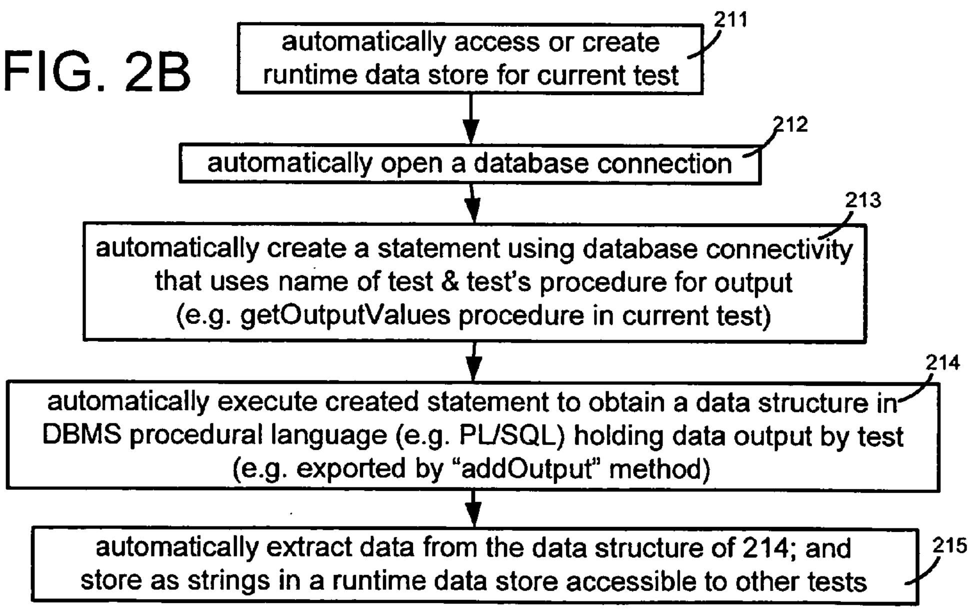
FIG. 2B
211
automatically access or create runtime data store for current test
212
automatically open a database connection
213
automatically create a statement using database connectivity that uses name of test & test's procedure for output (e.g. getOutputValues procedure in current test)
214
automatically execute created statement to obtain a data structure in DBMS procedural language (e.g. PL/SQL) holding data output by test (e.g. exported by "addOutput" method)
215
automatically extract data from the data structure of 214; and store as strings in a runtime data store accessible to other tests

301

```
CREATE OR REPLACE PACKAGE INV_DIAG_QAPACKAGE AS
/* $Header: inv_test_pls_s.pls 115.2 2005/08/13 01:16:07 minxu noship $ */

test_out VARCHAR2(200); -- will be assigned value in runTest and given to getOutputValue

PROCEDURE getDependencies (package_names OUT NOCOPY JTF_DIAG_DEPENDTBL);
-- str OUT NOCOPY VARCHAR2);
PROCEDURE isDependencyPipelined (str OUT NOCOPY VARCHAR2);
PROCEDURE getOutputValues(outputValues OUT NOCOPY JTF_DIAG_OUTPUTTBL);

  PROCEDURE init;
  PROCEDURE cleanup;
  PROCEDURE runtest(inputs IN JTF_DIAG_INPUTTBL,
            report OUT NOCOPY JTF_DIAG_REPORT,
            reportClob OUT NOCOPY CLOB);
  PROCEDURE getComponentName(str OUT NOCOPY VARCHAR2);
  PROCEDURE getTestName(str OUT NOCOPY VARCHAR2);
  PROCEDURE getTestDesc(str OUT NOCOPY VARCHAR2);
  PROCEDURE getDefaultTestParams(defaultInputValues OUT NOCOPY
JTF_DIAG_INPUTTBL);
  FUNCTION getTestMode return NUMBER;
END;
/
```

```
PROCEDURE getDependencies (package_names OUT NOCOPY
JTF_DIAG_DEPENDTBL) IS
 BEGIN
  package_names := JTF_DIAGNOSTIC_ADAPTUTIL.initDependencyTable;
 END getDependencies;

PROCEDURE isDependencyPipelined (str OUT NOCOPY VARCHAR2) IS
 BEGIN
  str := 'FALSE';
 END isDependencyPipelined;

PROCEDURE getOutputValues(outputValues OUT NOCOPY
JTF_DIAG_OUTPUTTBL) IS
  tempOutput JTF_DIAG_OUTPUTTBL;
 BEGIN
  tempOutput := JTF_DIAGNOSTIC_ADAPTUTIL.initOutputTable;
  tempOutput :=
JTF_DIAGNOSTIC_ADAPTUTIL.addOutput(tempOutput,'PASSWORD', test_out);
  outputValues := tempOutput;
 EXCEPTION
 when others then
 outputValues := JTF_DIAGNOSTIC_ADAPTUTIL.initOutputTable;
END getOutputValues;
```

```
  tempDependencies := JTF_DIAGNOSTIC_ADAPTUTIL.initDependencyTable;
  tempDependencies :=
JTF_DIAGNOSTIC_ADAPTUTIL.addDependency(tempDependencies,'INV_DIA
G_QAPACKAGE');
  tempDependencies :=
JTF_DIAGNOSTIC_ADAPTUTIL.addDependency(tempDependencies,'OE_DIA
G_QAPACKAGE');
  package_names := tempDependencies;
```

```
_connection = getActiveConnection();
  String callProcStr = "begin "+packageName+".GETOUTPUTVALUES(:1); end;";
  ocs = (OracleCallableStatement)_connection.prepareCall(callProcStr);
  ocs.registerOutParameter(1, OracleTypes.ARRAY, "JTF_DIAG_OUTPUTTBL");
  ocs.executeQuery();
```

FIG. 3D

```
-- SET VERIFY OFF
WHENEVER SQLERROR EXIT FAILURE ROLLBACK;
CREATE OR REPLACE PACKAGE BODY INV_DIAG_QAPACKAGE AS
/* $Header: inv_test_pls_b.pls 115.2 2005/08/13 01:16:21 minxu noship $ */
 --------------------------------------------------------
 -- procedure to report test name back to framework
 --------------------------------------------------------
 PROCEDURE getTestName(str OUT NOCOPY VARCHAR2) IS
 BEGIN
  str := 'Inv Test';
 END getTestName;
 --------------------------------------------------------
 -- procedure to report name back to framework
 --------------------------------------------------------
 PROCEDURE getComponentName(str OUT NOCOPY VARCHAR2) IS
 BEGIN
  str := 'Inv Tests';
 END getComponentName;
 --------------------------------------------------------
 -- procedure to report test description back to framework
 --------------------------------------------------------
 PROCEDURE getTestDesc(str OUT NOCOPY VARCHAR2) IS
 BEGIN
  str := 'Inv test to test core API calls';
 END getTestDesc;
 PROCEDURE getDependencies (package_names OUT NOCOPY JTF_DIAG_DEPENDTBL) IS
 BEGIN
  package_names := JTF_DIAGNOSTIC_ADAPTUTIL.initDependencyTable;
  -- str := 'null';
 END getDependencies;
 PROCEDURE isDependencyPipelined (str OUT NOCOPY VARCHAR2) IS
 BEGIN
  str := 'FALSE';
 END isDependencyPipelined;
 PROCEDURE getOutputValues(outputValues OUT NOCOPY JTF_DIAG_OUTPUTTBL) IS
  tempOutput JTF_DIAG_OUTPUTTBL;
 BEGIN
  tempOutput := JTF_DIAGNOSTIC_ADAPTUTIL.initOutputTable;
  tempOutput := JTF_DIAGNOSTIC_ADAPTUTIL.addOutput(tempOutput,'PASSWORD', test_out);
  outputValues := tempOutput;
 EXCEPTION
  when others then
  outputValues := JTF_DIAGNOSTIC_ADAPTUTIL.initOutputTable;
 END getOutputValues;
 --------------------------------------------------------
 -- procedure to provide/populate default parameters for test case.
 --------------------------------------------------------
 PROCEDURE getDefaultTestParams(defaultInputValues OUT NOCOPY JTF_DIAG_INPUTTBL) IS
  tempInput JTF_DIAG_INPUTTBL;
 BEGIN
  tempInput := JTF_DIAGNOSTIC_ADAPTUTIL.initinputtable;
  tempInput := JTF_DIAGNOSTIC_ADAPTUTIL.addInput(tempInput,'USERNAME','SYSADMIN');
  defaultInputValues := tempInput;
 EXCEPTION
  when others then
  defaultInputValues := JTF_DIAGNOSTIC_ADAPTUTIL.initinputtable;
 END getDefaultTestParams;
```

```
---------------------------------------------------------
-- procedure to report test mode back to the framework
---------------------------------------------------------
FUNCTION getTestMode RETURN NUMBER IS
BEGIN
  return(2);
END getTestMode;
---------------------------------------------------------
-- procedure to initialize test datastructures
-- executes prior to test run
---------------------------------------------------------
PROCEDURE init IS
BEGIN
 -- test writer could insert special setup code here
 null;
END init;
---------------------------------------------------------
-- procedure to cleanup any  test datastructures that were setup in the init
--  procedure call executes after test run
---------------------------------------------------------
PROCEDURE cleanup IS
BEGIN
 -- test writer could insert special cleanup code here
 NULL;
END cleanup;
---------------------------------------------------------
-- procedure to execute the PLSQL test
-- the inputs needed for the test are passed in and a report object and CLOB are -- returned.
---------------------------------------------------------
PROCEDURE runtest(inputs IN JTF_DIAG_INPUTTBL,
                  report OUT NOCOPY JTF_DIAG_REPORT,
                  reportClob OUT NOCOPY CLOB) IS
  reportStr  LONG;          -- REPORT
  sql_text  VARCHAR2(200);  -- SQL select statement
  c_username  VARCHAR2(50);  -- accept input for username
  statusStr  VARCHAR2(50);  -- SUCCESS or FAILURE
  errStr     VARCHAR2(4000); -- error message
  fixInfo    VARCHAR2(4000); -- fix tip
  isFatal    VARCHAR2(50);  -- TRUE or FALSE
  num_rows      NUMBER;
 BEGIN
  JTF_DIAGNOSTIC_ADAPTUTIL.setUpVars;  -- must have
  -- accept input
  c_username := JTF_DIAGNOSTIC_ADAPTUTIL.getInputValue('USERNAME',inputs);
  -- html formatting
  JTF_DIAGNOSTIC_ADAPTUTIL.addStringToReport('@html');
  JTF_DIAGNOSTIC_COREAPI.Show_Header(null, null); -- add html css
  test_out := FND_USER_PKG.getPasswordFromCurrentSession(c_username);
  reportStr := 'Inputs generated for Order Management Test is: ' || test_out;
  JTF_DIAGNOSTIC_ADAPTUTIL.addStringToReport(reportStr);  -- add to report
  -- for dummy testing, simply put status as 'SUCCESS'
  -- successful test will not show error message and fix info in report
  statusStr := 'SUCCESS';
  errStr := 'Test failure message displayed here';
  fixInfo := 'Fixing the test suggestions here';
  isFatal := 'FALSE';
  -- construct report
  report := JTF_DIAGNOSTIC_ADAPTUTIL.constructReport(statusStr,errStr,fixInfo,isFatal);
  reportClob := JTF_DIAGNOSTIC_ADAPTUTIL.getReportClob;
 END runTest;
END INV_DIAG_QAPACKAGE;
/
commit;
-- exit;
```

```
-- SET VERIFY OFF
WHENEVER SQLERROR EXIT FAILURE ROLLBACK;
CREATE OR REPLACE PACKAGE BODY OE_DIAG_QAPACKAGE AS
/* $Header: oe_test_pls_b.pls 115.2 2005/08/13 01:16:21 minxu noship $ */
 -----------------------------------------------------
 -- procedure to report test name back to framework
 -----------------------------------------------------
 PROCEDURE getTestName(str OUT NOCOPY VARCHAR2) IS
 BEGIN
  str := 'Order Management Test';
 END getTestName;
 -----------------------------------------------------
 -- procedure to report name back to framework
 -----------------------------------------------------
 PROCEDURE getComponentName(str OUT NOCOPY VARCHAR2) IS
 BEGIN
  str := 'Order Management Tests';
 END getComponentName;
 -----------------------------------------------------
 -- procedure to report test description back to framework
 -----------------------------------------------------
 PROCEDURE getTestDesc(str OUT NOCOPY VARCHAR2) IS
 BEGIN
  str := 'Order Management test to test core API calls';
 END getTestDesc;
 PROCEDURE getDependencies (package_names OUT NOCOPY JTF_DIAG_DEPENDTBL) IS
 BEGIN
  package_names := JTF_DIAGNOSTIC_ADAPTUTIL.initDependencyTable;
  --str := 'null';
 END getDependencies;
 PROCEDURE isDependencyPipelined (str OUT NOCOPY VARCHAR2) IS
 BEGIN
  str := 'FALSE';
 END isDependencyPipelined;
 PROCEDURE getOutputValues(outputValues OUT NOCOPY JTF_DIAG_OUTPUTTBL) IS
 BEGIN
  outputValues := JTF_DIAGNOSTIC_ADAPTUTIL.initOutputTable;
 END getOutputValues;
 -----------------------------------------------------
 -- procedure to provide/populate  the default parameters for the test case.
 -----------------------------------------------------
 PROCEDURE getDefaultTestParams(defaultInputValues OUT NOCOPY JTF_DIAG_INPUTTBL) IS
  tempInput JTF_DIAG_INPUTTBL;
 BEGIN
  tempInput := JTF_DIAGNOSTIC_ADAPTUTIL.initinputtable;
  tempInput := JTF_DIAGNOSTIC_ADAPTUTIL.addInput(tempInput,'PASSWORD','SYSADMIN');
  defaultInputValues := tempInput;
 EXCEPTION
  when others then
  defaultInputValues := JTF_DIAGNOSTIC_ADAPTUTIL.initinputtable;
 END getDefaultTestParams;
 -----------------------------------------------------
 -- procedure to report test mode back to the framework
 -----------------------------------------------------
 FUNCTION getTestMode RETURN NUMBER IS
 BEGIN
  return(2);
 END getTestMode;
```

```
-- procedure to initialize test datastructures
-- executes prior to test run
-----------------------------------------------------------
PROCEDURE init IS
BEGIN
 -- test writer could insert special setup code here
 null;
END init;
-----------------------------------------------------------
-- procedure to cleanup any test data structures that were setup in init
--  procedure call executes after test run
-----------------------------------------------------------
PROCEDURE cleanup IS
BEGIN
 -- test writer could insert special cleanup code here
 NULL;
END cleanup;
-----------------------------------------------------------
-- procedure to execute the PLSQL test
-- inputs needed for test are passed in & a report object and CLOB are
-- returned.
-----------------------------------------------------------
PROCEDURE runtest(inputs IN  JTF_DIAG_INPUTTBL,
                  report OUT NOCOPY JTF_DIAG_REPORT,
                  reportClob OUT NOCOPY CLOB) IS
  reportStr  LONG;          -- REPORT
  sql_text   VARCHAR2(2000); -- SQL select statement
  c_username  VARCHAR2(50);  -- accept input for username
  statusStr  VARCHAR2(50);  -- SUCCESS or FAILURE
  errStr     VARCHAR2(4000); -- error message
  fixInfo    VARCHAR2(4000); -- fix tip
  isFatal    VARCHAR2(50);  -- TRUE or FALSE
  -- num_rows    NUMBER;
 BEGIN
  JTF_DIAGNOSTIC_ADAPTUTIL.setUpVars; -- must have
  -- accept input
  c_username := JTF_DIAGNOSTIC_ADAPTUTIL.getInputValue('PASSWORD',inputs);
  -- html formatting
  JTF_DIAGNOSTIC_ADAPTUTIL.addStringToReport('@html');
  JTF_DIAGNOSTIC_COREAPI.Show_Header(null, null); -- add html css
  JTF_DIAGNOSTIC_ADAPTUTIL.addStringToReport('The test input is: ' || c_username); --add to report
  JTF_DIAGNOSTIC_COREAPI.BRPrint;  -- print a <br> in report
  IF (c_username = 'oracle') THEN  -- no affected transactions
   -- display SQL result in report
   sql_text := 'select organization_id, subinventory_code, inventory_item_id,creation_date ' ||
               ' from mtl_item_locations where inventory_location_id < 1';
   JTF_DIAGNOSTIC_COREAPI.run_sql(null, sql_text);
   statusStr := 'SUCCESS';
  ELSE
   statusStr := 'FAILURE';
  END IF;
  errStr := 'The input required by this test is not correct';
  fixInfo := 'Try to give the right input for test';
  isFatal := 'FALSE';
  -- construct report
  report := JTF_DIAGNOSTIC_ADAPTUTIL.constructReport(statusStr,errStr,fixInfo,isFatal);
  reportClob := JTF_DIAGNOSTIC_ADAPTUTIL.getReportClob;
 END runTest;
END OE_DIAG_QAPACKAGE;
```

FIG. 4D

```
-- SET VERIFY OFF
WHENEVER SQLERROR EXIT FAILURE ROLLBACK;
CREATE OR REPLACE PACKAGE BODY PIPE_DIAG_QAPACKAGE AS
/* $Header: pipe_test_pls_b.pls 115.2 2005/08/13 01:16:21 minxu noship $ */
 ----------------------------------------------------------
 -- procedure to report test name back to framework
 ----------------------------------------------------------
 PROCEDURE getTestName(str OUT NOCOPY VARCHAR2) IS
 BEGIN
  str := 'Pipe Test';
 END getTestName;
 ----------------------------------------------------------
 -- procedure to report name back to framework
 ----------------------------------------------------------
 PROCEDURE getComponentName(str OUT NOCOPY VARCHAR2) IS
 BEGIN
  str := 'Pipe Tests';
 END getComponentName;
 ----------------------------------------------------------
 -- procedure to report test description back to framework
 ----------------------------------------------------------
 PROCEDURE getTestDesc(str OUT NOCOPY VARCHAR2) IS
 BEGIN
  str := 'Pipe test to test core API calls';
 END getTestDesc;
 PROCEDURE getDependencies (package_names OUT NOCOPY JTF_DIAG_DEPENDTBL) IS
  tempDependencies JTF_DIAG_DEPENDTBL;
 BEGIN
  tempDependencies := JTF_DIAGNOSTIC_ADAPTUTIL.initDependencyTable;
  tempDependencies :=
JTF_DIAGNOSTIC_ADAPTUTIL.addDependency(tempDependencies,'INV_DIAG_QAPACKAGE');
  tempDependencies :=
JTF_DIAGNOSTIC_ADAPTUTIL.addDependency(tempDependencies,'OE_DIAG_QAPACKAGE');
  package_names := tempDependencies;
 EXCEPTION
 when others then
  package_names := JTF_DIAGNOSTIC_ADAPTUTIL.initDependencyTable;
 END getDependencies;
 PROCEDURE isDependencyPipelined(str OUT NOCOPY VARCHAR2) IS
 BEGIN
  str := 'TRUE';
 END isDependencyPipelined;
 PROCEDURE getOutputValues(outputValues OUT NOCOPY JTF_DIAG_OUTPUTTBL) IS
 BEGIN
 outputValues := JTF_DIAGNOSTIC_ADAPTUTIL.initOutputTable;
 END getOutputValues;
 ----------------------------------------------------------
 -- procedure to provide/populate default parameters for the test case.
 ----------------------------------------------------------
 PROCEDURE getDefaultTestParams(defaultInputValues OUT NOCOPY JTF_DIAG_INPUTTBL) IS
  tempInput JTF_DIAG_INPUTTBL;
 BEGIN
  tempInput := JTF_DIAGNOSTIC_ADAPTUTIL.initinputtable;
  tempInput := JTF_DIAGNOSTIC_ADAPTUTIL.addInput(tempInput,'USERNAME','SYSADMIN');
  defaultInputValues := tempInput;
 EXCEPTION
 when others then
 defaultInputValues := JTF_DIAGNOSTIC_ADAPTUTIL.initinputtable;
 END getDefaultTestParams;
```

```
-- procedure to report test mode back to the framework
--------------------------------------------------------
FUNCTION getTestMode RETURN NUMBER IS
BEGIN
 return(2);
END getTestMode;
--------------------------------------------------------
-- procedure to initialize test datastructures
-- executes prior to test run
--------------------------------------------------------
PROCEDURE init IS
BEGIN
 -- test writer could insert special setup code here
 null;
END init;
--------------------------------------------------------
-- procedure to cleanup any  test data structures that were setup in init
-- procedure call executes after test run
--------------------------------------------------------
PROCEDURE cleanup IS
BEGIN
 -- test writer could insert special cleanup code here
 NULL;
END cleanup;
--------------------------------------------------------
-- procedure to execute the PLSQL test -- the inputs needed for test
-- are passed in and a report object and CLOB are returned.
--------------------------------------------------------
PROCEDURE runtest(inputs IN  JTF_DIAG_INPUTTBL,
                  report OUT NOCOPY JTF_DIAG_REPORT,
                  reportClob OUT NOCOPY CLOB) IS
  reportStr  LONG;          -- REPORT
  sql_text   VARCHAR2(200);  -- SQL select statement
  c_username  VARCHAR2(50);  -- accept input for username
  statusStr  VARCHAR2(50);  -- SUCCESS or FAILURE
  errStr     VARCHAR2(4000); -- error message
  fixInfo    VARCHAR2(4000); -- fix tip
  isFatal    VARCHAR2(50);  -- TRUE or FALSE
  num_rows       NUMBER;
 BEGIN
  JTF_DIAGNOSTIC_ADAPTUTIL.setUpVars;  -- must have
  -- accept input
  c_username := JTF_DIAGNOSTIC_ADAPTUTIL.getInputValue('USERNAME',inputs);
  -- html formatting
  JTF_DIAGNOSTIC_ADAPTUTIL.addStringToReport('@html');
  JTF_DIAGNOSTIC_COREAPI.Show_Header(null, null); -- add html css
  -- for dummy testing, simply put status as 'SUCCESS'
  -- successful test will not show error message and fix info in report
  statusStr := 'SUCCESS';
  errStr := 'Test failure message displayed here';
  fixInfo := 'Fixing the test suggestions here';
  isFatal := 'FALSE';
  -- construct report
  report := JTF_DIAGNOSTIC_ADAPTUTIL.constructReport(statusStr,errStr,fixInfo,isFatal);
  reportClob := JTF_DIAGNOSTIC_ADAPTUTIL.getReportClob;
 END runTest;
END PIPE_DIAG_QAPACKAGE;
```

FIG. 4F

```
-- SET VERIFY OFF
WHENEVER SQLERROR EXIT FAILURE ROLLBACK;
CREATE OR REPLACE PACKAGE BODY PIPE_DIAG_QAPACKAGE2 AS
/* $Header: pipe_test_pls_b.pls 115.2 2005/08/13 01:16:21 minxu noship $ */
 ----------------------------------------------------------
 -- procedure to report test name back to framework
 ----------------------------------------------------------
 PROCEDURE getTestName(str OUT NOCOPY VARCHAR2) IS
 BEGIN
  str := 'Pipe Test2';
 END getTestName;
 ----------------------------------------------------------
 -- procedure to report name back to framework
 ----------------------------------------------------------
 PROCEDURE getComponentName(str OUT NOCOPY VARCHAR2) IS
 BEGIN
  str := 'Pipe Tests2';
 END getComponentName;
 ----------------------------------------------------------
 -- procedure to report test description back to framework
 ----------------------------------------------------------
 PROCEDURE getTestDesc(str OUT NOCOPY VARCHAR2) IS
 BEGIN
  str := 'Pipe test to test core API calls';
 END getTestDesc;
 PROCEDURE getDependencies (package_names OUT NOCOPY JTF_DIAG_DEPENDTBL) IS
  tempDependencies JTF_DIAG_DEPENDTBL;
 BEGIN
  tempDependencies := JTF_DIAGNOSTIC_ADAPTUTIL.initDependencyTable;
  tempDependencies :=
JTF_DIAGNOSTIC_ADAPTUTIL.addDependency(tempDependencies,'INV_DIAG_QAPACKAGE3');
  tempDependencies :=
JTF_DIAGNOSTIC_ADAPTUTIL.addDependency(tempDependencies,'oracle.apps.jtf.regress.qatool.testcase.Men
uTest');
  package_names := tempDependencies;
 EXCEPTION
 when others then
  package_names := JTF_DIAGNOSTIC_ADAPTUTIL.initDependencyTable;
 END getDependencies;
 PROCEDURE isDependencyPipelined(str OUT NOCOPY VARCHAR2) IS
 BEGIN
  str := 'TRUE';
 END isDependencyPipelined;
 PROCEDURE getOutputValues(outputValues OUT NOCOPY JTF_DIAG_OUTPUTTBL) IS
 BEGIN
  outputValues := JTF_DIAGNOSTIC_ADAPTUTIL.initOutputTable;
 END getOutputValues;
 ----------------------------------------------------------
 -- procedure to provide/populate the default parameters for the test case.
 ----------------------------------------------------------
 PROCEDURE getDefaultTestParams(defaultInputValues OUT NOCOPY JTF_DIAG_INPUTTBL) IS
  tempInput JTF_DIAG_INPUTTBL;
 BEGIN
  tempInput := JTF_DIAGNOSTIC_ADAPTUTIL.initinputtable;
  tempInput := JTF_DIAGNOSTIC_ADAPTUTIL.addInput(tempInput,'USERNAME','SYSADMIN');
  defaultInputValues := tempInput;
 EXCEPTION
 when others then
 defaultInputValues := JTF_DIAGNOSTIC_ADAPTUTIL.initinputtable;
 END getDefaultTestParams;
```

```
-- procedure to report test mode back to the framework
-------------------------------------------------------
FUNCTION getTestMode RETURN NUMBER IS
BEGIN
 return(2);
END getTestMode;
-------------------------------------------------------
-- procedure to initialize test datastructures
-- executes prior to test run
-------------------------------------------------------
PROCEDURE init IS
BEGIN
 -- test writer could insert special setup code here
 null;
END init;
-------------------------------------------------------
-- procedure to cleanup any test datastructures that were setup in init
--  procedure call executes after test run
-------------------------------------------------------
PROCEDURE cleanup IS
BEGIN
 -- test writer could insert special cleanup code here
 NULL;
END cleanup;
-------------------------------------------------------
-- procedure to execute the PLSQL test -- inputs needed for test
-- are passed in and a report object and CLOB are -- returned.
-------------------------------------------------------
PROCEDURE runtest(inputs IN  JTF_DIAG_INPUTTBL,
                  report OUT NOCOPY JTF_DIAG_REPORT,
                  reportClob OUT NOCOPY CLOB) IS
  reportStr  LONG;          -- REPORT
  sql_text   VARCHAR2(200);  -- SQL select statement
  c_username  VARCHAR2(50);  -- accept input for username
  statusStr  VARCHAR2(50);  -- SUCCESS or FAILURE
  errStr     VARCHAR2(4000); -- error message
  fixInfo    VARCHAR2(4000); -- fix tip
  isFatal    VARCHAR2(50);  -- TRUE or FALSE
  num_rows       NUMBER;
 BEGIN
  JTF_DIAGNOSTIC_ADAPTUTIL.setUpVars;  -- must have
  -- accept input
  c_username := JTF_DIAGNOSTIC_ADAPTUTIL.getInputValue('USERNAME',inputs);
  -- html formatting
  JTF_DIAGNOSTIC_ADAPTUTIL.addStringToReport('@html');
  JTF_DIAGNOSTIC_COREAPI.Show_Header(null, null); -- add html css
  -- for dummy testing, simply put status as 'SUCCESS'
  -- successful test will not show error message and fix info in report
  statusStr := '';
  errStr := '';
  fixInfo := '';
  isFatal := '';
  -- construct report
  report := JTF_DIAGNOSTIC_ADAPTUTIL.constructReport(statusStr,errStr,fixInfo,isFatal);
  reportClob := JTF_DIAGNOSTIC_ADAPTUTIL.getReportClob;
 END runTest;
END PIPE_DIAG_QAPACKAGE2;
```

FIG. 4H

```
jtfdiagadpttypes.sql:
create or replace type JTF_DIAG_OUTPUTS as object (
  position NUMBER,
  name VARCHAR2(100),
  value VARCHAR2(100));
/
create or replace type JTF_DIAG_OUTPUTTBL as TABLE of JTF_DIAG_OUTPUTS;
/
create or replace type JTF_DIAG_DEPENDTBL as table of VARCHAR2(4000);
/

jtfdiagadptutl_s.pls:
CREATE OR REPLACE PACKAGE JTF_DIAGNOSTIC_ADAPTUTIL AS

 ---------------------------
 --- PipeLining APIs
 ---------------------------
FUNCTION addOutput(outputs IN JTF_DIAG_OUTPUTTBL,var IN  VARCHAR2,val IN
VARCHAR2) RETURN JTF_DIAG_OUTPUTTBL;
 FUNCTION initOutputTable RETURN JTF_DIAG_OUTPUTTBL;

 FUNCTION addDependency(dependencies IN JTF_DIAG_DEPENDTBL, val IN  VARCHAR2)
RETURN JTF_DIAG_DEPENDTBL;
 FUNCTION initDependencyTable RETURN JTF_DIAG_DEPENDTBL;

END JTF_DIAGNOSTIC_ADAPTUTIL;
```

FIG. 4I

```
CREATE OR REPLACE PACKAGE BODY JTF_DIAGNOSTIC_ADAPTUTIL AS
---------------------------
 --- PipeLining APIs
 ---------------------------
  -------------------------------------------------------------------
  -- addOutput takes a table of JTF_DIAG_OUTPUTS in the form JTF_DIAG_OUTPUTTBL
  -- a varchar2 representing the variable to add and a varchar2 representing
  -- the value to add and this function will add create a new JTF_DIAG_OUTPUTS
  -- object from the variable and value and add this JTF_DIAG_OUTPUTS to
  -- a table of JTF_DIAG_OUTPUTS (JTF_DIAG_OUTPUTTBL) and return this.
  -------------------------------------------------------------------
FUNCTION addOutput(outputs IN JTF_DIAG_OUTPUTTBL,
                           var IN  VARCHAR2,
                           val IN  VARCHAR2) RETURN JTF_DIAG_OUTPUTTBL IS
 tempOutput JTF_DIAG_OUTPUTS;
 tempOutputTable JTF_DIAG_OUTPUTTBL;
 BEGIN
  tempOutputTable := outputs;
  tempOutput := JTF_DIAG_OUTPUTS(VISIBLE,var,val);
  tempOutputTable.extend(1);
  tempOutputTable(tempOutputTable.COUNT) := tempOutput;
        return tempOutputTable;
 EXCEPTION
  WHEN others THEN
        -- logging here...
        return outputs;
END;
```

FIG. 4J

```
--------------------------------------------------------------------
-- initialise a outputTable object and return it to the
-- caller method.   A table of a single empty JTF_DIAG_OUTPUTS
-- is created and and then removed with the call to trim -
-- this initializes the collection
--------------------------------------------------------------------
FUNCTION initOutputTable RETURN JTF_DIAG_OUTPUTTBL IS
 temp JTF_DIAG_OUTPUTTBL;
BEGIN
 temp := JTF_DIAG_OUTPUTTBL(JTF_DIAG_OUTPUTS(-1,'',''));
 temp.trim;
 return temp;
EXCEPTION
 WHEN others THEN
  return null;
END;
```

FIG. 4K

```
--------------------------------------------------------------------
-- addDependency takes a table of VARCHAR2(4000) in the form
-- JTF_DIAG_DEPENDTBL, and a varchar2 representing the value to add
-- and this function will add this value to
-- a table of VARCHAR2(4000) (JTF_DIAG_DEPENDTBL) and return this.
--------------------------------------------------------------------

FUNCTION addDependency(dependencies IN JTF_DIAG_DEPENDTBL,
                       val IN  VARCHAR2) RETURN JTF_DIAG_DEPENDTBL IS
 tempDependency VARCHAR2(4000);
 tempDependencyTable JTF_DIAG_DEPENDTBL;
 BEGIN
  tempDependencyTable := dependencies;
  tempDependency := val;
  tempDependencyTable.extend(1);
  tempDependencyTable(tempDependencyTable.COUNT) := tempDependency;
  return tempDependencyTable;
 EXCEPTION
  WHEN others THEN
        -- logging here...
        return dependencies;
END;
```

FIG. 4L

```
-------------------------------------------------------------------
-- initialise a dependencyTable object and return it to the
-- caller method.   A empty table of VARCHAR2(4000) is created
-------------------------------------------------------------------
 FUNCTION initDependencyTable RETURN JTF_DIAG_DEPENDTBL IS
 temp JTF_DIAG_DEPENDTBL;
BEGIN
 temp := JTF_DIAG_DEPENDTBL();
 -- temp.trim;
 return temp;
EXCEPTION
 WHEN others THEN
  return null;
END;

END jtf_diagnostic_adaptutil;
```

FIG. 4M

```
REM dbdrv: sql ~PROD ~PATH ~FILE none none none package &phase=pls \
REM dbdrv: checkfile:~PROD:~PATH:~FILE

SET VERIFY OFF
WHENEVER SQLERROR EXIT FAILURE ROLLBACK;

CREATE OR REPLACE PACKAGE INV_DIAG_QAPACKAGE AS
/* $Header: inv_test_pls_s.pls 115.2 2005/08/13 01:16:07 minxu noship $ */

  test_out  VARCHAR2(200);

 PROCEDURE getAppliedAppShortNames (str OUT NOCOPY VARCHAR2);
 PROCEDURE getDependencies (package_names OUT NOCOPY JTF_DIAG_DEPENDTBL);
 -- str OUT NOCOPY VARCHAR2);
 PROCEDURE isDependencyPipelined (str OUT NOCOPY VARCHAR2);
 PROCEDURE getOutputValues(outputValues OUT NOCOPY JTF_DIAG_OUTPUTTBL);

  PROCEDURE init;
  PROCEDURE cleanup;
  PROCEDURE runtest(inputs IN  JTF_DIAG_INPUTTBL,
              report OUT NOCOPY JTF_DIAG_REPORT,
              reportClob OUT NOCOPY CLOB);
  PROCEDURE getComponentName(str OUT NOCOPY VARCHAR2);
  PROCEDURE getTestName(str OUT NOCOPY VARCHAR2);
  PROCEDURE getTestDesc(str OUT NOCOPY VARCHAR2);
  PROCEDURE getDefaultTestParams(defaultInputValues OUT NOCOPY JTF_DIAG_INPUTTBL);
  FUNCTION  getTestMode return NUMBER;
END;
/
commit;
exit;
```

FIG. 4N

```
-- SET VERIFY OFF
WHENEVER SQLERROR EXIT FAILURE ROLLBACK;
CREATE OR REPLACE PACKAGE BODY INV_DIAG_QAPACKAGE AS
/* $Header: inv_test_pls_b.pls 115.2 2005/08/13 01:16:21 minxu noship $ */
 ------------------------------------------------------------
 -- procedure to report test name back to framework
 ------------------------------------------------------------
 PROCEDURE getTestName(str OUT NOCOPY VARCHAR2) IS
 BEGIN
  str := 'Inv Test';
 END getTestName;
 ------------------------------------------------------------
 -- procedure to report name back to framework
 ------------------------------------------------------------
 PROCEDURE getComponentName(str OUT NOCOPY VARCHAR2) IS
 BEGIN
  str := 'Inv Tests';
 END getComponentName;
 ------------------------------------------------------------
 -- procedure to report test description back to framework
 ------------------------------------------------------------
 PROCEDURE getTestDesc(str OUT NOCOPY VARCHAR2) IS
 BEGIN
  str := 'Inv test to test core API calls';
 END getTestDesc;
 PROCEDURE getDependencies (package_names OUT NOCOPY JTF_DIAG_DEPENDTBL) IS
 BEGIN
  package_names := JTF_DIAGNOSTIC_ADAPTUTIL.initDependencyTable;
  -- str := 'null';
 END getDependencies;
 PROCEDURE isDependencyPipelined (str OUT NOCOPY VARCHAR2) IS
 BEGIN
  str := 'FALSE';
 END isDependencyPipelined;
 PROCEDURE getOutputValues(outputValues OUT NOCOPY JTF_DIAG_OUTPUTTBL) IS
  default_passwd    VARCHAR2(200);
  tempOutput        JTF_DIAG_OUTPUTTBL;
 BEGIN
  tempOutput := JTF_DIAGNOSTIC_ADAPTUTIL.initOutputTable;
  default_passwd := FND_USER_PKG.getDefaultPassword;
  tempOutput := JTF_DIAGNOSTIC_ADAPTUTIL.addOutput(tempOutput,'PASSWORD',
default_passwd);
  outputValues := tempOutput;
 EXCEPTION
  when others then
  outputValues := JTF_DIAGNOSTIC_ADAPTUTIL.initOutputTable;
 END getOutputValues;
 ------------------------------------------------------------
 -- procedure to provide/populate the default parameters for the test case.
 ------------------------------------------------------------
 PROCEDURE getDefaultTestParams(defaultInputValues OUT NOCOPY JTF_DIAG_INPUTTBL) IS
  tempInput JTF_DIAG_INPUTTBL;
 BEGIN
  tempInput := JTF_DIAGNOSTIC_ADAPTUTIL.initinputtable;
  tempInput := JTF_DIAGNOSTIC_ADAPTUTIL.addInput(tempInput,'USERNAME','SYSADMIN');
  defaultInputValues := tempInput;
 EXCEPTION
  when others then
  defaultInputValues := JTF_DIAGNOSTIC_ADAPTUTIL.initinputtable;
 END getDefaultTestParams;
```

FIG. 40

```
------------------------------------------------------
-- procedure to report test mode back to the framework
------------------------------------------------------
FUNCTION getTestMode RETURN NUMBER IS
BEGIN
 return(2);
END getTestMode;
------------------------------------------------------
-- procedure to initialize test datastructures
-- executes prior to test run
------------------------------------------------------
PROCEDURE init IS
BEGIN
 -- test writer could insert special setup code here
 null;
END init;
------------------------------------------------------
-- procedure to cleanup any  test datastructures that were setup in the init
--  procedure call executes after test run
------------------------------------------------------
PROCEDURE cleanup IS
BEGIN
 -- test writer could insert special cleanup code here
 NULL;
END cleanup;
------------------------------------------------------
-- procedure to execute the PLSQL test
-- the inputs needed for the test are passed in and a report object and CLOB are -- returned.
------------------------------------------------------
PROCEDURE runtest(inputs IN  JTF_DIAG_INPUTTBL,
                  report OUT NOCOPY JTF_DIAG_REPORT,
                  reportClob OUT NOCOPY CLOB) IS
  sql_text    VARCHAR2(200);  -- SQL select statement
  c_username  VARCHAR2(50);   -- accept input for username
  statusStr   VARCHAR2(50);   -- SUCCESS or FAILURE
  errStr      VARCHAR2(4000); -- error message
  fixInfo     VARCHAR2(4000); -- fix tip
  isFatal     VARCHAR2(50);   -- TRUE or FALSE
  num_rows         NUMBER;
 BEGIN
  JTF_DIAGNOSTIC_ADAPTUTIL.setUpVars;  -- must have
  -- accept input
  c_username := JTF_DIAGNOSTIC_ADAPTUTIL.getInputValue('USERNAME',inputs);
  -- html formatting
  JTF_DIAGNOSTIC_ADAPTUTIL.addStringToReport('@html');
  JTF_DIAGNOSTIC_COREAPI.Show_Header(null, null); -- add html css
  -- for dummy testing, simply put status as 'SUCCESS'
  -- successful test will not show error message and fix info in report
  statusStr := 'SUCCESS';
  errStr := 'Test failure message displayed here';
  fixInfo := 'Fixing the test suggestions here';
  isFatal := 'FALSE';
  -- construct report
  report := JTF_DIAGNOSTIC_ADAPTUTIL.constructReport(statusStr,errStr,fixInfo,isFatal);
  reportClob := JTF_DIAGNOSTIC_ADAPTUTIL.getReportClob;
 END runTest;
END INV_DIAG_QAPACKAGE;
/
commit;
-- exit;
```

FIG. 4P

```
/**
* Determine if the dependent test classes are pipelined.
* If they are pipelined, a dependent class will always use the output from
* previous class as input.
*
* @return true if dependent classes are pipelined.
*/

public boolean isDependencyPipelined()
{
  // the following is the pseudo-code
  1. open a JDBC connection;

  2. create a Callable statement which calls the PL/SQL procedure of a particular PL/SQL
diagnostic test: ISDEPENDENCYPIPELINED, by using that JDBC connection;

  3. execute that statement, and obtain the VARCHAR type of value from that PL/SQL
procedure, and then convert it to a String;

  4. close connection

  5. if the String value equals "TRUE" (ignoring case), then return Boolean value - true;
     else then return Boolean value - false;
}
```

```
/**
* Gets all dependent class names. These classes are not tested here, but the tested
*  classes depend on them to work.
*
* @return Dependent class names.
*/

public String[] getDependencies()
{
  // the following is the pseudo-code
  1. open a JDBC connection;

  2. create a Callable statement which calls the PL/SQL procedure of a particular PL/SQL
diagnostic test: GETDEPENDENCIES , by using that JDBC connection;

  3. execute that statement, and obtain an ARRAY containing the name of tests to be
pipelined, or called dependencies;

  4. close connection

  5. if the Array is not null, then convert it to a String array and return this String array;
     else then return an empty String array;
}
```

```
/**
* Gets output (name,value) pairs after running the test.
*
* @return A Hashtable that contains output names and their corresponding values.
*/

public Hashtable getOutputValues()
{
  // the following is the pseudo-code 212
  1. open a JDBC connection;                                213C

  2. create a Callable statement which calls the PL/SQL procedure of a particular
PL/SQL diagnostic test: GETOUTPUTVALUES, by using the JDBC connection;

  3. execute that statement, and obtain an ARRAY containing the name-value pairs
as the outputs of this test which can be pipelined into the next test;
                                                              214C
  4. close connection

  5. if the Array is not null, then parse this Array to get every name-value pair, and
then create a Hashtable , and then insert those name-value pairs into such
Hashtable, and finally return this Hashtable;
     else then return an empty Hashtable;                  215C
}
```

FIG. 5C

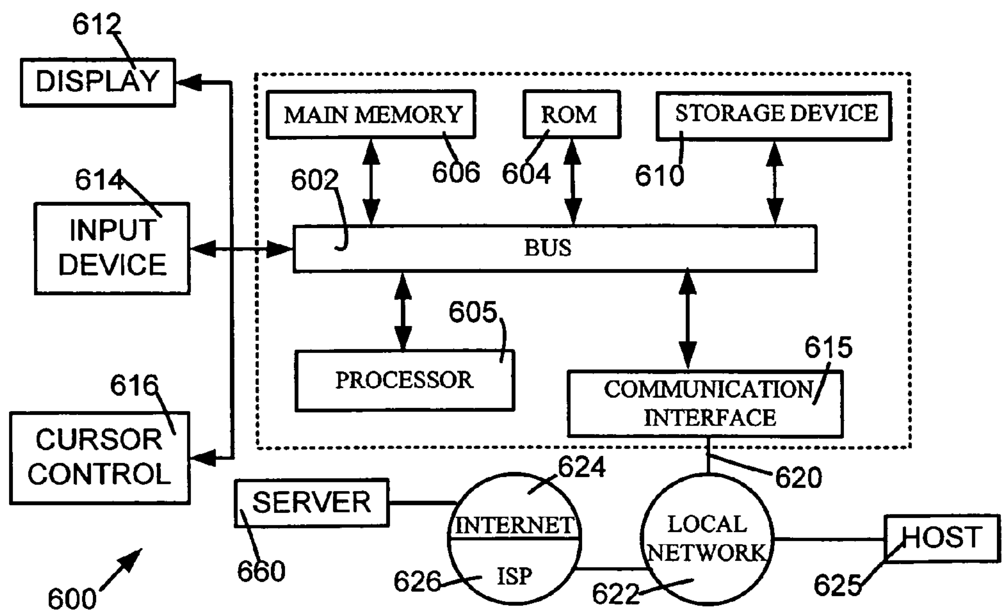

FIG. 6

PIPELINING OF INPUT/OUTPUT PARAMETERS BETWEEN APPLICATION TESTS WRITTEN IN A DBMS PROCEDURAL LANGUAGE

BACKGROUND

Prior art diagnostics software allows users to execute test scripts (also called "tests") on application software of the type included in, for example, an Enterprise Resource Planning (ERP) suite. The prior art diagnostics software may provide a framework to integrate test cases and automate the execution of test cases. The framework may provide mechanisms to write (and run) tests, either in Java or in a procedural language used in database management systems (DBMS) such as PL/SQL supported by software available from ORACLE Corporation. Other examples of a DBMS procedural language include SQL/OLB (which forms part 10 of the ANSI SQL-99 standard, and defines extensions of SQL to support embedding of SQL statements into programs written in Java), MICROSOFT's Transact-SQL language, and IBM's Persistent SQL Modules (PSM) language. Vendor-specific SQL procedural languages are incompatible with one another and this could be a reason why users (also called "test developers") may choose to write test scripts for more than one vendor's systems, using Java.

Test scripts can be written through a tool for writing Java software such as JDeveloper available from Oracle Corporation and/or any editing tool for writing PL/SQL software, such as Notepad available from Microsoft Corporation, or a diagnostics application's user interface or via a Web-based user interface (UI). Metadata about test scripts may be stored in diagnostic schema. One such prior art system is illustrated in FIG. 1A, which is described briefly below and in greater detail in U.S. patent application Ser. No. 10/991,607 filed on Nov. 17, 2004, with Sowmya Subramanian as the first inventor that is incorporated by reference herein in its entirety. See also U.S. patent application Ser. Nos. 10/991,608, and 10/991,883 that are both also incorporated by reference herein in their entirety as background.

FIG. 1A is a diagrammatic representation of an implementation architecture of a diagnostics and testing framework of the prior art. An architecture 100, which may be part of a computing system (FIG. 1B) which includes processors and storage devices on which code devices associated with the architecture are stored, is arranged to provide a diagnostics and testing framework, e.g., a testing framework. Within architecture 100, repositories 101 and 102 are arranged to store data, e.g., repository 102 is arranged to store information pertaining to one or more tests. Repository 101 may be a database that stores tables of data. When an execution engine 103 runs a test 109 via a method of a predetermined name (e.g. "runtest" method 104 in FIG. 1A), execution engine 103 accesses the information in repositories 101 and 102. Execution engine 103 also logs information via a writer (not labeled with a reference number in FIG. 1A).

In general, execution engine 103 (FIG. 1A) includes core execution logic associated with architecture 100, and delegates calls or logic to appropriate sources. Execution engine 103 may take user commands and cause a test script to be run and registered, and also cause test results or output to be displayed as appropriate. For example, when a test script is to be run, execution engine 103 calls into a test interface 105 which effectively provides handshaking between execution engine 103 and adapters such as PL/SQL adapter 107 and SQL test adapter 108, and Java tests 106.

Java tests 106 which contain runtime information, a PL/SQL adapter 107, and SQL test adapter 108, and any other such adapters are all arranged to interface with execution engine 103 via test interface 105. Such elements effectively rewrite data into a language or format that is understood by test interface 105. Each of the elements which are effectively plugged into test interface 105 include a generic adapter portion or a common layer. Each element plugged into test interface 105 essentially extends the functionality or logic associated with the generic adapter portion. Note that a runtime data store is part of execution engine 103 in FIG. 1A, and the store is accessed via a Java data structure that was used for pipelining (i.e. transfer) of data only between two tests that were both written in Java.

For use in such an architecture 100 (FIG. 1B), a test script can be written by a user (or test developer) 130 for use as an individual test, or as a container test (also called "master" test) that causes execution of multiple individual tests (also called "dependencies"). In FIG. 1B, testA (labeled with reference numeral 111) and testB (labeled with reference numeral 112) are individual tests which are intended to respectively test Application A (labeled with reference numeral 121) and Application B (labeled with reference numeral 122). An example of Application A is ORACLE Inventory Optimization. An example of Application B is ORACLE Order Management. The user 130 also writes a container test (labeled with reference numeral 113) which contains the names of these two test scripts 111 and 112, and these two tests are executed when the container test is executed. Note, that container test 113 contains test names but does not contain (or replicate) commands that are present in individual test scripts 111 and 112.

Individual test scripts that are manually written in Java (such as testA and testB) for use in ORACLE Diagnostics, version 2.2 or 2.3 can be "pipelined" to pass data therebetween. Examples of test scripts 111 and 112 are illustrated in FIGS. 1C and 1D. Pipelining enables passage of output parameters from one individual Java test (such as testA test script 111) which data may be temporarily held in a run time data store (labeled with reference numeral 123 in FIG. 1B) as input parameters of a next individual Java test (such as testB test script 112), if both tests are named within a container test (such as container test 113).

An example of lines written by a user 130 as container test 113 is illustrated in FIG. 1E. As noted above, a container test (such as test 113) does not contain the actual software present in the individual test scripts (such as tests 111 and 112) to be pipelined, and instead the container test script contains the names of the individual test scripts. To support pipelining of data between individual test scripts as shown in FIG. 1E, a user 130 must add lines of the type illustrated in FIGS. 1C and 1D to the individual test scripts 111 and 112. For example, user 130 must write the first Java test script to specify the output values to be passed from itself (see FIG. 1C) to the next Java test script (see FIG. 1D). This is illustrated in FIG. 1C, by using a hash table to return a result 140 from the getOutputValues( ) API, which is a function 141 that user 130 manually writes for each individual Java test script, if it is to be a member of a pipeline in a container test.

Note that output data in result 140 of FIG. 1C (which is stored in runtime data store 123 in FIG. 1B) is not passed from a current Java test script to the next Java test script unless that next Java test script specifies input parameters of precisely the same name as the output parameters of the current Java test script. This is illustrated in FIG. 1D, by use of the Java function getInputValue( ) API, in statements 142 and 143 which reads from the runtime data store the values of parameters "Username" and "LanguageCode" respectively.

Moreover, the user 130 must also initialize, in container test 113 (see FIG. 1E), an array of strings called "dependentClassNames" (labeled with reference numeral 144 in FIG. 1E) to the individual names of test scripts that are being pipelined. Note that the names of the two tests shown in FIGS. 1C and 1D are stored in the "dependencies" variable in statement 147 (FIG. 1E). Additionally user 130 must set a flag called "isDependencyPipelined" (labeled with reference numeral 145 in FIG. 1E) to the value "true".

In response to container test 113 (FIG. 1E), a prior art execution engine 103 (FIG. 1A) performs the method 150 illustrated in FIG. 1F. Specifically, after receipt of the tests in step 151, engine 103 creates an array containing the test names (as per step 152), followed by use of the array to initialize a Java object for each test name (as per step 153). In step 154, a loop variable I is initialized to 0, followed by steps 155-159 as discussed next.

In act 155 (FIG. 1F), engine 103 checks to see if a current Java object corresponding to the current test name identified by array element I requires any input and if so goes to step 156 and alternatively goes to step 158. In step 156, engine 103 checks if the current object already has input, and if not an error is reported and if so, goes to step 157 wherein data from a runtime data store 123 is set up as the input data. Next in step 158, engine 103 calls the run test method of object I, followed by execution of the test, followed by storing the output in runtime data store 123 (FIG. 1B). Note that runtime data store 123 of the prior art is used only to store the data output by tests which are expressed in Java.

Next, engine 103 goes to step 159 wherein the loop count I is incremented and if not all tests specified in container test 113 have been performed, returns to step 155. When pipelining data between individual tests as shown in steps 155-159, an execution engine of the prior art does not execute any database queries, and instead simply executes the byte codes of Java which are present in each of tests 111-113.

Note that in the prior art Java test script (shown in FIG. 1D), a user could specify a value for input parameters in a constructor (e.g. via the function "addInput( . . . )"), e.g. if this value would not be passed to it by the previous Java test script (i.e. if script 111 shown in FIG. 1C was not used). It was common for an addInput function to be used in the prior art (see statements 146 in FIG. 1D) to specify input parameters that a test was to have, with certain prompt names (e.g. "Username" and "LanguageCode" in statements 146) in a user interface (UI) web page, and corresponding default values (e.g. "SYSADMIN" and "US" in statements 146) to which these input parameters were to be initialized.

Hence, input values if specified by a test (via addInput) or if corresponding values are received from a database or a user, then such values ("original values") were automatically passed to each individual Java test specified as a dependency in a container test, whether the Java test was pipelined or not pipelined. However, if an individual Java test was pipelined, then it's output values when saved in the runtime data store overwrite any pre-existing values in the runtime data store thereby passing the output values to a next Java test.

To the knowledge of the inventor of this current patent application, to pipeline Java tests in prior art system 100 (FIG. 1A), a test developer needs to: (1) write a container test in Java, which contains test names to be pipelined as the value(s) for a predetermined class "dependentClassNames," (labeled with reference numeral 144 in FIG. 1E) (2) return value of "isDependencyPipelined" set to "true" (labeled with reference numeral 145); and (3) for the test to be pipelined, write a method getOutputValues( ) to retrieve the output data from the first test in the form of a hash table and to supply this data as the input data of the second test (labeled with reference numeral 141 in FIG. 1C).

To the knowledge of the inventor of this current patent application, the above-described prior art system 100 did not support pipelining between PL/SQL tests, although individual PL/SQL tests could be executed via PL/SQL adapter 107 (FIG. 1A). FIGS. 1G and 1H illustrate a PL/SQL test called "testC". In the prior art, in act 155 (FIG. 1F) if a test 109 (FIG. 1A) was written in PL/SQL, the execution engine used database connectivity to open a database call and execute a procedure "getDefaultTestParams" to check if the test had any input parameters. Also, in the prior art method, in act 156, the execution engine checked if data for a PL/SQL test was available via a user interface or via default input but did not check the runtime store accessible to Java objects because the test was written in PL/SQL.

After execution of the "runtest" procedure of a testC (labeled with reference numeral 161 in FIG. 1H) in act 158, the execution engine 103 receives PL/SQL variables "report" and "reportClob" (labeled with reference numerals 163 and 164 in FIG. 1H). However, there was no mechanism in execution engine 103, prior to the invention described below, for testC (written in PL/SQL) to write into or in any manner retrieve data from a runtime data store used by Java objects. Moreover, there was also no mechanism prior to the invention for testC (written in PL/SQL) to communicate any information to/from another PL/SQL test.

Accordingly, if pipelining of data was necessary between two tests in prior art system 100, e.g. in order to test interaction between two applications sold by Oracle Corporation, as data pipelining was not supported for PL/SQL tests, the user (or test developer) 130 could write both test scripts in Java, but this requires the user to be knowledgeable about Java. Hence, the current inventor believes there is a need to enable pipelining of data to or from a PL/SQL test script, which need can be met as discussed below.

SUMMARY

Many embodiments of the invention implement certain methods to obtain output values from a first test written in a DBMS procedural language (such as PL/SQL), and thereafter automatically pass the output values of the first test to a second test. In some embodiments, the second test is also written in the same DBMS procedural language in which the first test is written. Accordingly, a user no longer needs to write two diagnostic tests in Java, in order to transfer data therebetween, contrary to the above-described need in prior art systems (e.g. Oracle Diagnostics versions 2.2 and 2.3).

In various embodiments of the invention, one or more tests written in a DBMS procedural language can additionally be pipelined with one or more other tests written in a programming language, such as the object oriented programming language "Java." A container test that identifies two or more individual tests that are being pipelined in accordance with the invention may itself be written in either the DBMS procedural language or the programming language (which may be object oriented), thereby to enable pipelining of data to span across tests in different languages, depending on the embodiment.

In several embodiments of the invention, a human user (or test developer) manually creates a container test which contains names of individual tests whose data is to be pipelined. In some embodiments, the user simply adds to the container test one or more statements that define procedures of predetermined names regardless of the specific individual tests that are pipelined in the container test. The procedures of predetermined names in the container test are invoked to identify dependencies between the individual tests (e.g. procedures isDependencyPipelined and getDependencies). The user additionally adds to each individual test one or more additional statements that define additional procedures of additional predetermined names to store data output by an individual test into a runtime store (e.g. procedure getOutputValues) that is accessible to other individual tests.

In certain embodiments, an execution engine for an adapter or an API package for tests written in the DBMS procedural language (e.g. PL/SQL) is enhanced with additional software, which when executed extracts test names from the container test and uses each name to automatically create for each test, an object in an object oriented programming language (e.g. Java) which is also called a "pseudo" object. In some embodiments, such pseudo objects form wrappers around tests that are written in the DBMS procedural language (e.g. PL/SQL). The pseudo objects are themselves executed in the normal manner, similar or identical to execution of objects that are originally written by a user in the object oriented programming language (e.g. Java). Note that a runtime store is accessible by both the automatically created pseudo-objects and the user-written objects, thereby to enable the above-described pipelining of data across different language tests.

Several embodiments require the user to include, in each test that generates data for a next test, (1) a statement to declare a variable in a package specification file, for use in a package body file to be assigned the data which is to be output, and (2) include additional statements written in the DBMS procedural language (e.g. PL/SQL) to interface with the variable. These statements, which are included in tests in DBMS procedural language (e.g. PL/SQL), are for use by an adapter or API package of some embodiments, to implement pipelining by writing data to and reading data from the variable.

BRIEF DESCRIPTION OF THE DRAWINGS

FIGS. 1C and 1D illustrate prior art samples of Java code, for two individual tests, namely testA and testB.

FIG. 1E illustrates prior art sample of Java code, for a container test that pipelines data between testA and testB.

FIGS. 1G and 1H together illustrate a prior art individual test, namely an old version of testC, which is written in PL/SQL.

FIG. 2A illustrates a method including one or more of acts 201-206 that are manually performed in some embodiments of the invention, by a user or test developer, in order to prepare test scripts originally expressed in a DBMS procedural language (such as PL/SQL) for pipelining of data therebetween.

FIG. 2B illustrates, in a flow chart, a method including one or more of acts 211-215 that are performed in accordance with the invention to execute a test script prepared for pipelining, e.g. by performing the method shown in FIG. 2A.

FIG. 3A illustrates declarations that are made as per acts 201 and 202 in one illustrative embodiment of FIG. 2A.

FIGS. 3B and 3C illustrate statements which are added to test scripts as per acts 203 and 206 respectively, in one illustrative embodiment of FIG. 2A.

FIG. 3D illustrates changes to a PL/SQL adapter in the illustrative embodiment to use the statements and declarations in FIGS. 3A, 3B and 3C.

FIGS. 4A and 4B together illustrate an individual test script prepared as per the method of FIG. 2A.

FIGS. 4C and 4D together illustrate another individual test script also prepared as per the method of FIG. 2A.

FIGS. 4E and 4F together illustrate a container test script also prepared as per the method of FIG. 2A.

FIGS. 4G and 4H together illustrate an alternative container test script also prepared as per the method of FIG. 2A.

FIGS. 4I-4M illustrate certain predetermined statements expressed in PL/SQL that are included in one or more test scripts of some embodiments of the invention.

FIG. 4N illustrates a package specification file containing a number of declarations, including a declaration of the temporary variable "test_out" which is used in some embodiments to pass data from a procedure "runTest" to another procedure "getOutputValue."

FIGS. 4O and 4P together illustrate an alternative embodiment of the test script illustrated in FIGS. 4A and 4B.

FIGS. 5A, 5B and 5C illustrate in pseudo code, acts performed by a PL/SQL adapter to invoke three procedures of predetermined names, in some embodiments of the invention.

FIG. 6 illustrates, in a high level block diagram, hardware included in a computer that may be used to perform the methods used in some embodiments of the invention.

DETAILED DESCRIPTION

Figure 1A:
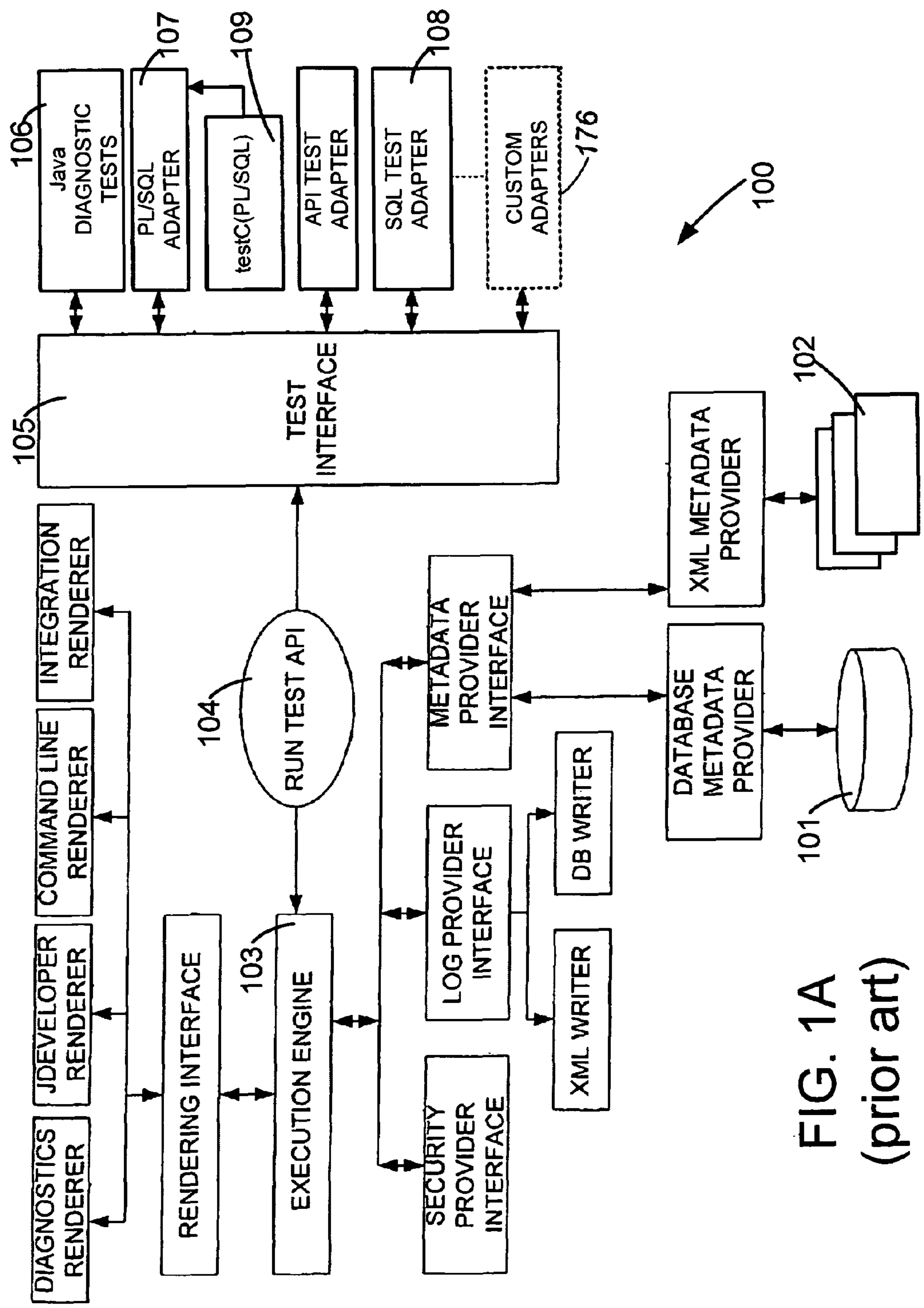
FIG. 1A illustrates, in a block diagram, an architecture of the prior art, which includes a diagnostics and testing framework for use in testing prior art application software (also called simply "application").
Figure 1B:
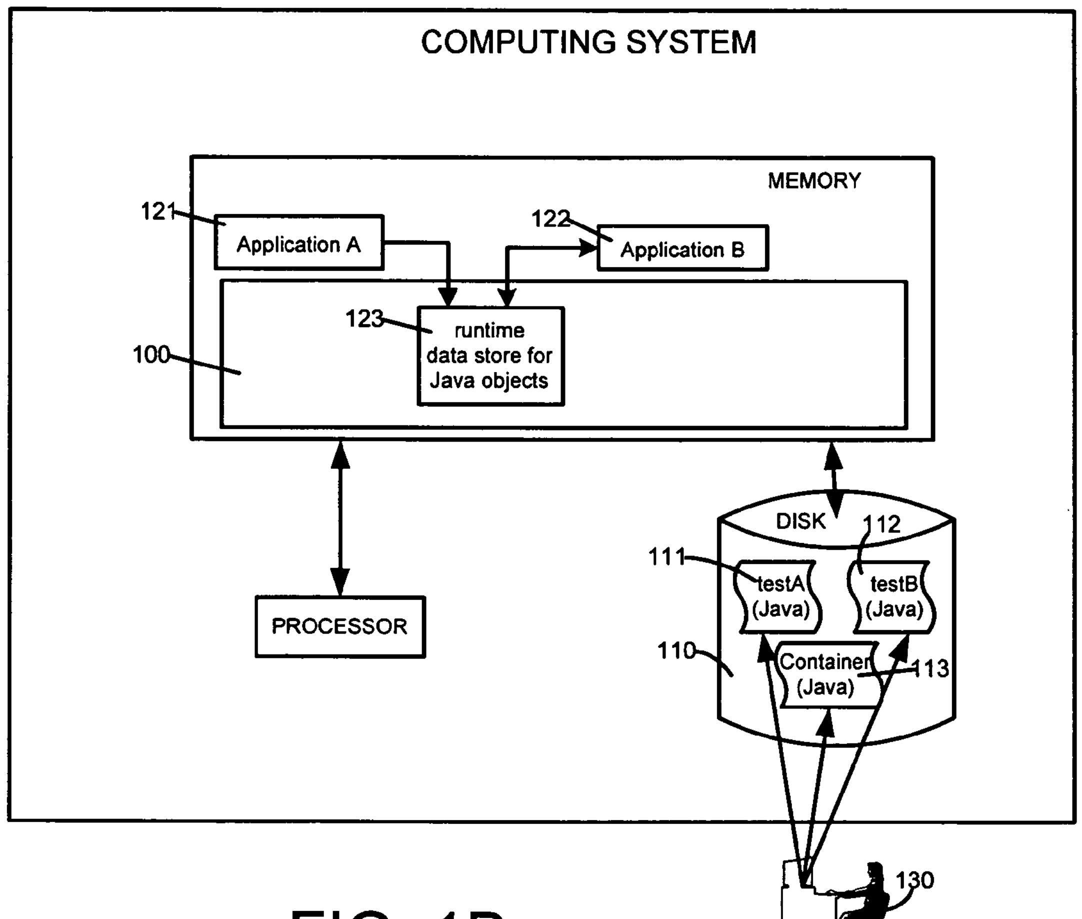
FIG. 1B illustrates, in another block diagram, the architecture of FIG. 1A used by Java tests 111 and 112 to test respective applications 121 and 122, and use of container test 113 also written in Java, to transfer data therebetween.

In some embodiments of the invention, a user creates test scripts that are expressed in a DBMS procedural language to include certain statements that provide support for pipelining of data between the test scripts. Specifically, as illustrated in act 201 in FIG. 2A, the user adds a statement to declare a variable to transfer data from a procedure in DBMS procedural language (e.g. "runtest") to a procedure for storing the data to be pipelined, in a runtime data store.

The just-described procedure is also called an "interface procedure" in accordance with the invention because it provides an interface for transferring data between the DBMS procedural language and a programming language, such as Java. In an illustrative embodiment, a variable named "test_out" is declared as a string of characters (labeled as 301 in FIG. 3A). As discussed below, in this embodiment, variable "test_out" is initialized by a procedure named "runTest" which writes data to this variable. An interface procedure of the predetermined name "getOutputValues" (when executed) reads the data from this variable. Note that either or both the procedure (named "getOutputValues") and variable being declared (named "test_out") may have different name(s) in other embodiments, as long as such names in any embodiment are consistently used in a container test and in individual tests identified in that container test.

Some alternative embodiments use a differently named variable, e.g. a variable named "next_test_data" in both procedures "runTest" and "getOutputValues" to pass data between these procedures which is to be supplied to the next test. Other alternative embodiments do not even pass data from the runTest procedure to the getOutputValue procedure because the data needed by the next test is already available to procedure getOutputValue (without need to be passed from the runTest procedure), e.g. via environment variable(s), in which case act 201 may be skipped (i.e. not performed by the user). Accordingly, in any one or more such ways, procedure getOutputValue of a current test obtains data for the next test, as will be apparent to the skilled artisan.

In addition, as illustrated in act 202 in FIG. 2A, the user adds one or more statement(s) to declare the interface procedure of act 201 and any other interface procedure(s) which may be needed for pipelining. In the illustrative embodiment, as shown by statements labeled 302 in FIG. 3A, two additional procedures of predetermined names "getDependencies" and "isDependencyPipelined" are also declared (in addition to declaring procedure "getOutputValues"). Declaration statements 301 and 302 are added, in this illustrative embodiment, in a specification file (FIG. 3A) for the test script, which is expressed in the DBMS procedural language, such as PL/SQL. Note that for illustrative purposes the PL/SQL language is used herein as an example of a DBMS procedural language, but as noted above other languages that may be used in other embodiments of the invention, include, for example, SQL/OLB language, Transact-SQL language, and Persistent SQL Modules (PSM) language.

Although in the illustrative embodiment, statements 301 and 302 are manually prepared by a human user who adds them to the specification file for a test, in alternative embodiments such statements may be added automatically by a computer (e.g. the computer may be programmed with software to automatically open the specification file and insert these statements). In some embodiments, a user creates test scripts for their own applications by appropriately including the three interface procedures of predetermined names, based on illustrative examples of test scripts (e.g. see FIGS. 4A-4H and 4N) which are supplied by the manufacturer of a database management system (DBMS), e.g. Oracle Corporation.

The three names "getDependencies", "isDependencyPipelined" and "getOutputValues" for interface procedures that are used in FIG. 3A are meant to be illustrative, and as will be apparent to the skilled artisan, any other names may be used in other embodiments. Note, however, that whatever names are declared in acts 201 and 202, the same names must be used consistently in other related acts, such as act 203 (discussed below) in which the instructions to perform these procedures are defined, and in an adapter or API package from which the procedures are invoked (for execution of the procedures). As noted above in paragraph [0048], use of the variable name "test_out" is also illustrative. Also as will be apparent to the skilled artisan, although the illustrative embodiment uses three interface procedures, other embodiments may use a greater number or a smaller number of interface procedures. For example, the two interface procedures "getDependencies" and "isDependencyPipelined" may be combined into a single interface procedure, in alternative embodiments.

Moreover, for a test that outputs data to be pipelined, the user adds (as per act 203 in FIG. 2A), to the test, additional code in DBMS procedural language (such as PL/SQL) to perform at least the interface procedure of act 201 by use of the variable (e.g. "test_out") of act 201, to output thereto one or more name-value pairs for the data. As will be apparent to the skilled artisan, any data available in the current test that the user wishes to transfer to any subsequent test can be included in the code that is being added by the user in act 203. The type of data that the user may transfer in variable test_out may include data generated within the current test, and reported, for example, in "reportString" or "reportClob" (see items 463 and 464 in FIG. 4B).

In the illustrative embodiment, statements 303, 304 and 305 (FIG. 3B) are manually added by the user in a body file for the test script, to implement the respective interface procedures getDependencies, isDependencyPipelined, and getOutputValues. In several embodiments, an execution engine is programmed to use these procedures to automatically convert the DBMS procedural language instructions of a test being pipelined into an object in an object oriented programming language, such as the Java language (also called "pseudo" object), which may be then executed similar to other tests which are written by the user in the same object oriented programming language, e.g. Java.

Note that the user customizes the DBMS procedural language instructions shown in FIG. 3B appropriately for each test script involved in data pipelining. For example, in a script for an individual test, the user sets the variable "str" to FALSE, although in a script for a container the user sets the variable "str" to TRUE. As another example, although a statement 306 is illustrated in FIG. 3B as being included in statements 305, such a statement is not required for a test script that does not output any data to be pipelined. As yet another example, if a test script does not supply data to be pipelined, then that the user may decide to skip act 201 for that test script. The customization which is required to be done (by a user or automatically) for each test script to use the invention is apparent to the skilled artisan in view of this current disclosure, as illustrated, for example, in FIGS. 4A-4H.

Note that functions "addOutput", "initOutputTable" and "initDependencyTable" which are used in statements 306-308 in FIG. 3B are illustrated in FIGS. 4J, 4K and 4M respectively. Moreover, function "addDependency" which is used in FIG. 3C is illustrated in FIG. 4L. All these functions are declared as shown in FIG. 4I. Accordingly, FIGS. 4I-4M contain predetermined statements which are included as shown, in one or more PL/SQL tests that are manually written by a user in some embodiments of the invention.

In several embodiments, the user also performs acts 204 and 205 (FIG. 2A) as discussed next. Specifically, in act 204, for each test that receives data being pipelined, the user confirms presence of commands in DBMS procedural language, to set up input variables. In an illustrative embodiment, the user visually confirms that the commands in procedure "runtest" in the current test include a PL/SQL statement to invoke a procedure named getInputValue. Note that procedure getInputValue is used by the user in PL/SQL tests in a manner similar or identical to its prior art version, in many embodiments of the invention. Hence, as discussed below in reference to act 256 in FIG. 2C, when executing procedure getInputValue for a PL/SQL test in accordance with the invention, the execution engine checks for existence of input data in a run time data store and when not found then obtains the input data from the user via a user interface (such as a web page accessible through a browser). Referring back to FIG. 2A, in act 205, for each test that receives data being pipelined, the user confirms that names of input variables in the current test are identical to names used in the data being output in (and pipelined by) the previous test.

In order to set up the pipelining of data between tests, the user also performs an act 206 to create a container test by including therein, names of each of the tests in acts 203 and 204, in sequence relative to one another. In the illustrative embodiment, as shown in FIG. 3C, a variable "package_names" is initialized to a sequence of names of the individual tests to be performed. Note that these statements (of FIG. 3C) that identify the tests being pipelined may be included in statements 303 in FIG. 3B for a container test. As will be apparent to the skilled artisan, the acts illustrated in FIG. 2A (and in any other figure in this current disclosure, unless indicated otherwise) may be performed in any order relative to one another.

An individual test which is prepared as described above in reference to acts 201-203 in FIG. 2A may be executed as illustrated by the acts 211-215 illustrated in FIG. 2B, by a computer that is appropriately programmed (e.g. by use of an execution engine in Oracle Diagnostics, version 2.4 which is available from Oracle Corporation, 500 Oracle Parkway, Redwood Shores, Calif.). Specifically, in act 211, the computer automatically creates a runtime data store for the current test, for example if it is the very first test. Alternatively if the current test is not a first test, the computer may access data from a previously created run time data store. Next, in act 212, the computer automatically opens a database connection, e.g. using JDBC.

After opening the database connection, next in act 213, the computer automatically creates a statement using database connectivity that uses name of test & test's interface procedure (e.g. one of procedures getOutputValues, isDependencyPipelined and getDependencies in current test). In the illustrative embodiment, the computer creates a string 309 (FIG. 3D) and then creates a statement using the string. Next, in act 214 the computer automatically executes this newly created statement (which contains a database query).

On completion of execution (via the database call), the computer obtains a data structure in DBMS procedural language (e.g. PL/SQL) which holds the data that has been output by the test (e.g. exported by "addOutput" method). Note that the data that is output in act 214 may be different depending on the procedure, e.g. procedure getDependencies outputs a sequence of test names (in order of pipelining relative to one another), whereas procedure getOutputValues outputs a series of name-value pairs. Then, in an optional act 215 (FIG. 2B), the computer automatically extracts the data from the PL/SQL data structure and stores the extracted data in runtime data store. Note that act 215 is optional because it is performed in a method to invoke procedure getOutputValues but it is not performed in methods to invoke procedures isDependencyPipelined and getDependencies.

Although execution of a test script expressed in DBMS procedural language (e.g. PL/SQL), as described above in reference to FIG. 2B, may appear similar to execution of a corresponding test script expressed in Java, there are at least two differences in many embodiments of the current invention: (1) execution of database queries is required for DBMS procedural language test scripts and (2) invocation of an interface procedure to store output in a runtime data store is required for DBMS procedural language test scripts. By executing database queries when necessary and using interface procedures to transfer data across language boundaries, an adapter for a DBMS procedural language (e.g. PL/SQL) leverages existing support for data pipelining in Java tests, when executing tests written in the DBMS procedural language. Some embodiments additionally differ from Java test scripts by (3) invoking one or more interface procedure(s) in PL/SQL through a database call, to determine whether individual tests are being pipelined and to identify the names of specific tests which are being pipelined.

Moreover, in certain embodiments of the invention, a test developer may invoke individual tests from any language, in a container test, to pass data therebetween. In several embodiments, an adapter or an API package for tests written in the DBMS procedural language (e.g. PL/SQL) is enhanced with additional software, to extract test names from the container test. The extracted test names are each used to create, for each test, an object in an object oriented programming language (e.g. Java) as illustrated in FIG. 2C, and discussed next.

Figure 1F:
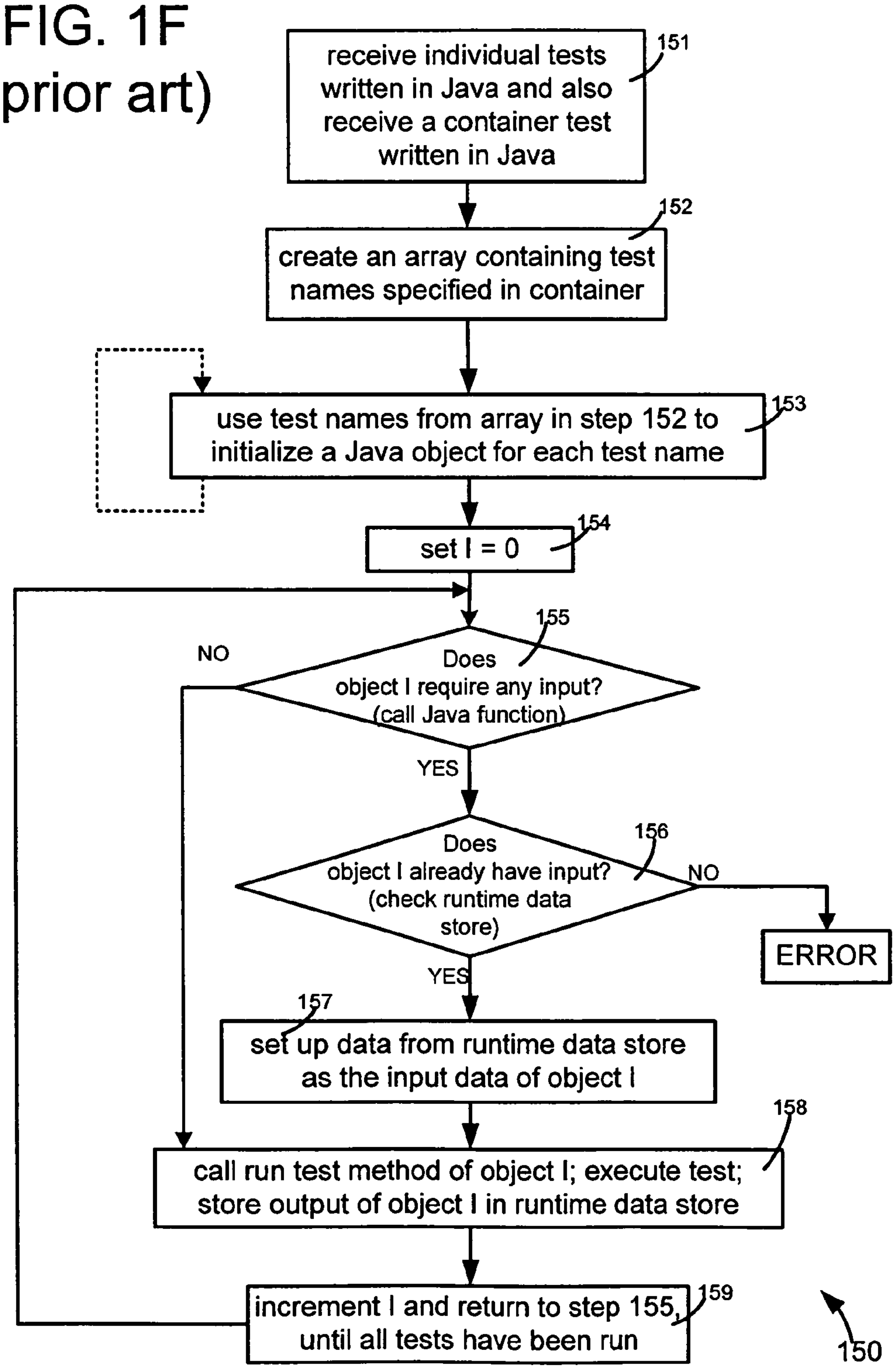
FIG. 1F illustrates, in a flow chart, acts performed by method 150 in prior art architecture 100 (FIGS. 1A and 1B), to execute the container test of FIG. 1E which in turn invokes the two individual tests of FIGS. 1C and 1D.
Figure 2C:
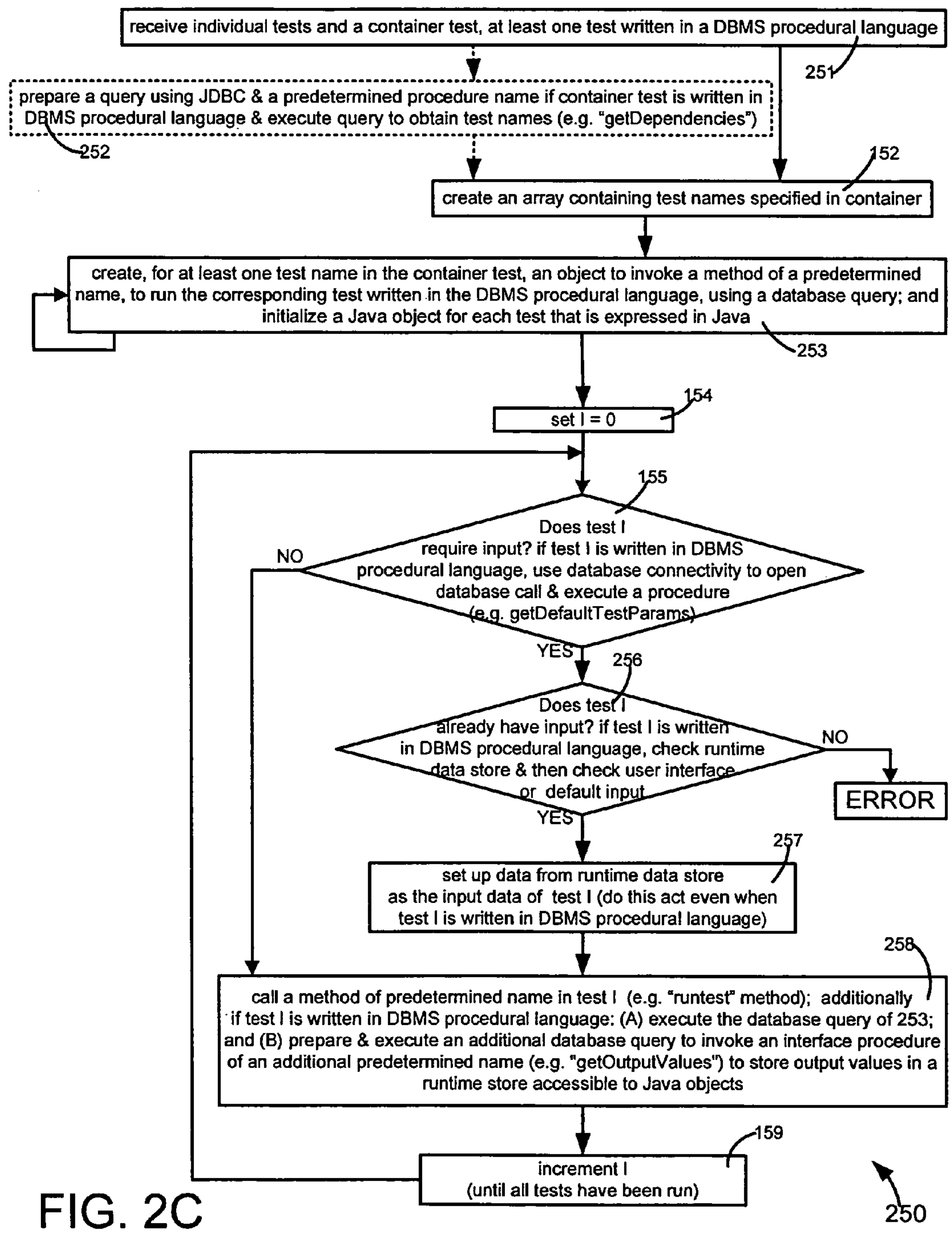
FIG. 2C illustrates, in a flow chart, a method performed by an adapter in some embodiments of the invention, to use the method of FIG. 2B, to implement pipelining from a test expressed in a DBMS procedural language, to another test (expressed in object oriented language or in DBMS procedural language).

In some embodiments of the invention, a computer is programmed to perform a method 250 illustrated in FIG. 2C. Method 250 (FIG. 2C) in accordance with the invention includes one or more acts that are similar or identical to corresponding steps of a prior art method 150 (FIG. 1F) described above, as illustrated by use of the same reference numerals in FIG. 2C. Specifically, method 250 (FIG. 2C) includes steps 152, 154, 155 and 159 which were described in the Background section above in reference to FIG. 1F. However, method 250 (FIG. 2C) includes a number of acts which are different, as discussed next.

Method 250 can receive individual tests and container tests at least one of which may be expressed in a DBMS procedural language as described above, in an act 251 shown in FIG. 2C. If in act 251 the container test that is received happens to be expressed in Java, then the computer may proceed directly to act 152 in FIG. 2C. However, if the container test is expressed in the DBMS procedural language, then the computer first performs an act 252, which is then followed by act 152 as discussed next.

In act 252, the computer prepares a query using a database connectivity technology, such as JDBC. In preparing the query the computer also uses a predetermined name for a procedure that is programmed to extract the names of tests which are specified in the container test (e.g. as being pipelined). Next, in act 152, the computer automatically creates an array containing these test names. Then, in act 253, the computer automatically uses the test names to create, for each test, an object in the object oriented programming language, such as Java.

Note that in act 253, a Java object is initialized in the normal manner (as in act 153), for each test expressed in Java but if the test is expressed in the DBMS procedural language, then a pseudo-object is created. As noted above the pseudo-object forms a wrapper around a database query to execute a procedure in the test. More specifically, the computer creates (in act 253), for each test the DBMS procedural language, a Java object which uses a database query to invoke a method of a predetermined name defined in the test, to run the test. Such an object (with an embedded database query) is shown in FIG. 3D, for an illustrative embodiment.

After completion of act 253, the computer proceeds to act 154, wherein as described above, the computer sets a loop variable I to zero, followed by act 155. Act 155 in method 250 is similar to act 155 in prior art method 150 described above, wherein the computer checks if test I requires input. To perform this check, the computer uses database connectivity in the prior art manner, to open database call & execute a procedure. In the illustrative embodiment, the procedure being executed is named "getDefaultTestParams." For an illustrative example of this procedure, see the commands 401 in FIG. 4A.

In act 155, if the answer is yes, then the computer goes to act 256 and checks if test I already has input. To perform this check, the computer checks the runtime data store, and then checks the user interface followed by default input. Note that in method 250, the computer is programmed to perform this check (in act 256) even if the test is expressed in the DBMS procedural language. If the answer in act 256 is no, the computer flags an error, and exits from executing the current test. If the answer in act 256 is yes, then the computer proceeds to act 257. In act 257, the computer sets up data from runtime data store as the input data of current test I and then goes to act 258. Once again, note that in method 250, the computer is programmed to perform this act 257 even if the test is expressed in the DBMS procedural language.

Also note that the computer goes to act 258 if the answer was no in act 155 when performing method 250 (FIG. 2C). In act 258, the computer performs acts 212-215 (FIG. 2B) in some embodiments. Specifically, in several embodiments of act 258 (FIG. 2C), the computer directly calls the runtest method of the current test, e.g. if the test is expressed in Java. If the test is expressed in the DBMS procedural language then the computer executes a database query which was prepared in act 253 (which in turn calls the runtest procedure of this test), followed by preparing and executing an additional database query to invoke an interface procedure of a predetermined name (e.g. getOutputValues) to store the output values in a runtime data store.

As will be apparent to the skilled artisan from this current disclosure, use of the runtime data store to hold data from execution of PL/SQL tests enables such data to be supplied to Java tests and vice versa. Hence, completion of act 258 (FIG. 2C) for a test expressed in the DBMS procedural language provides results identical to the results obtained if this same test were manually written by the user in Java. After completion of act 258, the computer proceeds to act 159 wherein the loop count is incremented in the normal manner (as described above in reference to FIG. 1F), followed by returning to act 155. Note that the loop count is not incremented beyond the number of tests, i.e. when all tests have been run the computer exits from performing the method of FIG. 2C.

Figure 2D:
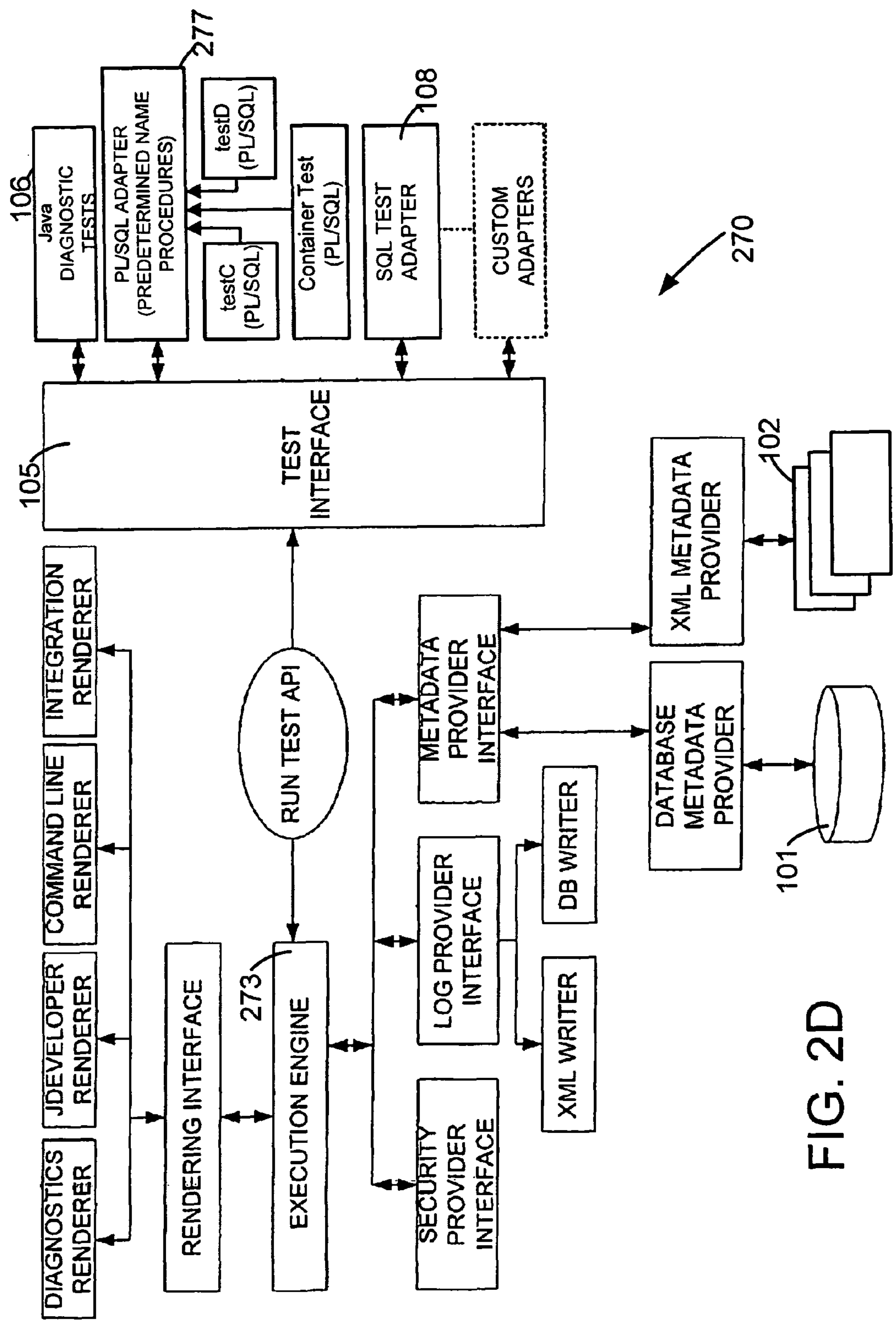
FIG. 2D illustrates, in a high level block diagram, an architecture of certain illustrative embodiments, which use database calls to procedures of predetermined names when implementing pipelining of data between tests on application software, in the method of FIG. 2B.

FIG. 2D is a diagrammatic representation of an implementation architecture 270 of a diagnostics and testing framework of some embodiments of the current invention which is similar or identical to architecture 100 of the prior art shown in FIG. 1A. Execution engine 273 differs from execution engine 103, by virtue of additional programming to perform method 250 described above in reference to FIG. 2C. Note that the PL/SQL adapter 277 in FIG. 2C has been programmed in the illustrated embodiment to use interface procedures of predetermined names, for example procedures named as getOutputValues, isDependencyPipelined and getDependencies that are defined in one or more PL/SQL tests.

Note further that architecture 270 (FIG. 2D) is backward compatible with architecture 100 (FIG. 1A). Accordingly, all tests that exist in architecture 100 (e.g. Oracle Diagnostics version 2.3) can be used unchanged in architecture 270 (e.g. Oracle Diagnostics version 2.4).

Also, to follow good programming practices, users of some embodiments prepare each PL/SQL test to contain a definition of each of the three interface procedures getOutputValues, isDependencyPipelined and getDependencies, whether or not they are likely to be used. See FIGS. 4A-4H and 4N for illustrative examples of user-written software that is included in such tests. FIGS. 4I-4M illustrate helper software included in the PL/SQL adapter 277 (FIG. 2D) that is supplied with Oracle Diagnostics version 2.4, to be called in such tests. In alternative embodiments, the users skip including one or more of the interface procedures which are unlikely to be needed in the respective tests. Specifically, in the alternative embodiments, a container test contains only the two interface procedures isDependencyPipelined and getDependencies but doesn't contain the third interface procedure, while individual tests contain just one interface procedure, namely the procedure getOutputValues but do not contain the other two interface procedures.

FIGS. 4A and 4B together illustrate a single individual test script, namely a new version of testC expressed in PL/SQL, which is prepared as per the method of FIG. 2A. In particular, note the inclusion of PL/SQL statements 403 and 404 for interface procedures isDependencyPipelined and getDependencies which are implemented as "place holders" or "stubs" because this test script testC is not a container script. Note also inclusion of PL/SQL statements 405 in FIG. 4A which implement the procedure getOutputValues for testC in the above-described manner.

Note that this new version of testC also includes PL/SQL statements 401 (FIG. 4A) for the procedure getDeafaultTestParams and PL/SQL statements 402 (FIG. 4B) for the procedure runTest. Note that statements 401 are identical to the corresponding statements in the old version of testC shown in FIGS. 1G and 1H. However, statements 402 shown in FIG. 4B are not identical to the old version of testC. Instead, in some embodiments one or more temporary variables (such as variable 'test_out' illustrated as item 461 in FIG. 4B) is/are initialized in statements 402, with certain information generated within the runtest procedure which needs to be transferred to a next test.

Accordingly, the temporary variable(s) is/are used in statements 405 when these statements are invoked by execution of procedure getOutputValues, to store the information from the temporary variables into a runtime store that supplies the information to the next test in the pipeline, such as testD. Alternative embodiments do not use temporary variables for pipelining purposes in statements 402 of a runtest procedure, and instead, procedure getOutputValues independently retrieves the information that needs to be supplied to the next test directly, e.g. from an environment variable as illustrated in FIGS. 4O and 4P. Note that the only differences between the testC shown in FIGS. 4O and 4P and the testC shown in FIGS. 4A and 4B are in the getOutputValues procedure and runTest procedure respectively.

Note that FIGS. 4C and 4D together illustrate another individual test script, namely a new version of testD expressed in PL/SQL, which is also prepared as per the method of FIG. 2A. Finally, note that FIGS. 4E and 4F together illustrate a container test script expressed in PL/SQL, which is also prepared as per the method of FIG. 2A, to transfer data between two PL/SQL test scripts (identified by names 411 and 412). Although FIGS. 4E and 4F illustrate pipelining of two PL/SQL test scripts, it is also possible to pipeline the data output by a PL/SQL test script to a Java test script (identified by names 411 and 413) as illustrated in FIGS. 4G and 4H together. Note that various procedures (such as procedures 421 and 422 in FIG. 4C) are implemented by certain predetermined PL/SQL statements, as illustrated in FIGS. 4I-4M.

Various acts illustrated in FIG. 2B are implemented by an execution engine of some embodiments which performs customized versions of these acts as shown in FIGS. 5A-5C when implementing respective procedures. More specifically, when performing act 252 in FIG. 2C, the execution engine initially checks if the individual tests which are identified in a container test are pipelined, by invoking a procedure isDependencyPipelined. Procedure isDependencyPipelined performs acts 212-215 described above in reference to FIG. 2B, but customized as shown in FIG. 5A and described next.

When performing procedure isDependencyPipelined, the execution engine opens a JDBC connection to the database as per act 212 in FIG. 5A. Then the execution engine prepares a callable statement (such as an Oracle Callable Statement) to invoke the PL/SQL procedure isDependencyPipelined of the current test, as per act 213A in FIG. 5A (by using that JDBC connection). Next, the execution engine executes the just-prepared statement, and obtains a value (e.g. as a VARCHAR type) from the PL/SQL procedure isDependencyPipelined, and then convert the value into a string, as per act 214A, following which the JDBC connection is closed. Then, in act 215A, the execution engine checks if the string value equals "TRUE" (ignoring case) and if so then it returns the Boolean value for true and otherwise returns the Boolean value for false.

If procedure isDependencyPipelined for the current test returns false, then the execution engine may go from act 252 directly to act 155 in method 250 (FIG. 2C). If procedure isDependencyPipelined returns true, then the execution engine performs another procedure within act 252, namely the procedure getDependencies. As illustrated in FIG. 5B, this procedure getDependencies is implemented by an execution engine by again performing acts 212-215 of FIG. 2B, but customized for this procedure getDependencies, as described next.

Referring to FIG. 5B, the execution engine again performs act 212, followed by preparing and executing a callable statement to invoke procedure getDependencies of the current test, as per acts 213B and 214B. Note that on completion of act 214B (execution of query), a PL/SQL array containing test names is obtained from procedure getDependencies, following which the JDBC connection is closed. Then, in act 215B, the execution engine creates (and returns) a string array of the test names, unless the PL/SQL array returned in act 214B was null.

In act 258 (FIG. 2C), the execution engine performs procedure getOutputValues as illustrated in FIG. 5C by again performing acts 212-215 of FIG. 2B, but customized for this procedure getOutputValues, as described next. Referring to FIG. 5C, the execution engine again performs act 212, followed by preparing and executing a callable statement to invoke procedure getOutputValues of the current test, as per acts 213C and 214C. Note that on completion of act 214C, a PL/SQL array which contains name-value pairs for names and values of the output parameters of the current test is obtained from procedure getDependencies, following which the JDBC connection is closed. Then, in act 215C, the execution engine creates (and returns) a hash table of the name-value pairs (e.g. a Hashtable object in Java), unless the PL/SQL array returned in act 214C was null.

Note that a system which performs the acts illustrated in FIGS. 2B and 2C may be implemented in some embodiments by use of a computer (e.g. an IBM PC) or workstation (e.g. Sun Ultra 20) that is programmed with an application server, of the type available from Oracle Corporation of Redwood Shores, Calif. Such a computer can be implemented by use of hardware that forms a computer system 600 as illustrated in FIG. 6. Specifically, computer system 600 includes a bus 602 (FIG. 6) or other communication mechanism for communicating information, and a processor 605 coupled with bus 602 for processing information.

Computer system 600 also includes a main memory 606, such as a random access memory (RAM) or other dynamic storage device, coupled to bus 602 for storing information and instructions to be executed by processor 605. Main memory 606 also may be used for storing temporary variables or other intermediate information during execution of instructions to be executed by processor 605. Computer system 600 further includes a read only memory (ROM) 604 or other static storage device coupled to bus 602 for storing static information and instructions for processor 605. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 605. Another type of user input device is cursor control 616, such as a mouse, a trackball, or cursor direction keys for communicating direction information and command selections to processor 605 and for controlling cursor movement on display 612. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 600 in response to processor 605 executing instructions programmed to perform the above-described acts and contained in main memory 606. Such instructions may be read into main memory 606 from another computer-readable medium, such as storage device 610. Execution of instructions contained in main memory 606 causes processor 605 to perform the process steps described herein. In alternative embodiments, hard-wired circuitry may be used in place of or in combination with software instructions to implement an embodiment of the type illustrated in FIGS. 2B and 2C. Thus, embodiments of the invention are not limited to any specific combination of hardware circuitry and software.

The term "computer-readable storage medium" as used herein refers to any storage medium that participates in providing instructions to processor 605 for execution. Such a storage medium may take many forms, including but not limited to, non-volatile storage media, and volatile storage media. Non-volatile storage media includes, for example, optical or magnetic disks, such as storage device 610. Volatile storage media includes dynamic memory, such as main memory 606.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, as described hereinafter, or any other storage medium from which a computer can read.

Various forms of computer readable media may be involved in carrying the above-described instructions to processor 605 to implement an embodiment of the type illustrated in FIGS. 2B and 2C. For example, such instructions may initially be carried on a magnetic disk of a remote computer. The remote computer can load such instructions into its dynamic memory and send the instructions over a telephone line using a modem. A modem local to computer system 600 can receive such instructions on the telephone line and use an infra-red transmitter to convert the received instructions to an infra-red signal. An infra-red detector can receive the instructions carried in the infra-red signal and appropriate circuitry can place the instructions on bus 602. Bus 602 carries the instructions to main memory 606, in which processor 605 executes the instructions contained therein. The instructions held in main memory 606 may optionally be stored on storage device 610 either before or after execution by processor 605.

Computer system 600 also includes a communication interace 615 coupled to bus 602. Communication interface 615 provides a two-way data communication coupling to a network link 620 that is connected to a local network 622. Local network 622 may interconnect multiple computers (as described above). For example, communication interace 615 may be an integrated services digital network (ISDN) card or a modem to provide a data communication connection to a corresponding type of telephone line. As another example, communication interace 615 may be a local area network (LAN) card to provide a data communication connection to a compatible LAN. Wireless links may also be implemented. In any such implementation, communication interace 615 sends and receives electrical, electromagnetic or optical signals that carry digital data streams representing various types of information.

Network link 620 typically provides data communication through one or more networks to other data devices. For example, network link 620 may provide a connection through local network 622 to a host computer 625 or to data equipment operated by an Internet Service Provider (ISP) 626. ISP 626 in turn provides data communication services through the world wide packet data communication network 624 now commonly referred to as the "Internet". Local network 622 and network 624 both use electrical, electromagnetic or optical signals that carry digital data streams. The signals through the various networks and the signals on network link 620 and through communication interace 615, which carry the digital data to and from computer system 600, are exemplary forms of carrier waves transporting the information.

Computer system 600 can send messages and receive data, including program code, through the network(s), network link 620 and communication interace 615. In the Internet example, a server 660 might transmit software through Internet 624, ISP 626, local network 622 and communication interace 615. In accordance with the invention, one such downloaded set of instructions implements an embodiment of the type illustrated in FIGS. 2B and 2C. The received set of instructions may be executed by processor 605 as received, and/or stored in storage device 610, or other non-volatile storage for later execution. In this manner, computer system 600 may obtain the instructions in the form of a carrier wave.

Numerous modifications and adaptations of the embodiments described herein will be apparent to the skilled artisan in view of the disclosure.

Accordingly numerous such modifications and adaptations are encompassed by the attached claims.

What is claimed is:

1. A computer-implemented method of executing tests, the method comprising:

receiving a container test expressed in a database management system (DBMS) procedural language, wherein the container test comprises a plurality of test names of a corresponding plurality of tests;

automatically preparing and executing an initial database query to invoke an initial interface procedure defined in the container test;

automatically using an output of the initial interface procedure to create an array of the plurality of test names;

automatically creating, for each test name in the array, an object to invoke a method to run the corresponding test, thereby resulting in a plurality of objects corresponding to the plurality of test names;

automatically using a first object in the plurality of objects to run a first test in the corresponding plurality of tests, by executing a first database query to invoke a first method to run the first test;

automatically preparing and executing an additional database query to invoke an additional interface procedure defined in the first test, wherein the additional interface procedure automatically stores, in a runtime store accessible to the plurality of objects, an array of name-value pairs, each name-value pair comprising a name of an output parameter of the first test and a value of the output parameter; and automatically using a second object in the plurality of objects to run a second test in the corresponding plurality of tests, by preparing and executing a second database query to invoke a second method to run the second test, while supplying at least one value from the runtime store as an input parameter to the second test if the name of the output parameter of the first test is identical to a name of the input parameter of the second test.

2. The computer-implemented method of executing tests of claim 1 further comprising:

automatically using a third object in the plurality of objects to run a third test in the corresponding plurality of tests, while supplying from the runtime store at least a second value as an input parameter to the third test, if a second name corresponding to the second value is identical to a third name of said input parameter of the third test.

3. The computer-implemented method of executing tests of claim 1 wherein:

the DBMS procedural language is PL/SQL.

4. The computer-implemented method of executing tests of claim 1 wherein:

the first test is expressed in the DBMS procedural language; and the second test is expressed in an object oriented language.

5. The computer-implemented method of executing tests of claim 1 wherein:

the first test is expressed in PL/SQL; and the second test is expressed in Java.

6. The computer-implemented method of executing tests of claim 1 wherein:

at least one test in the corresponding plurality of tests is expressed in an object oriented language.

7. One or more non-transitory computer-readable storage media comprising instructions, said instructions comprising:

instructions to receive a container test expressed in a database management system (DBMS) procedural language, wherein the container test comprises a plurality of test names of a corresponding plurality of tests;

instructions to prepare and execute an initial database query to invoke an initial interface procedure defined in the container test;

instructions to use an output of the initial interface procedure to create an array of the plurality of test names;

instructions to create, for each test name in the array, an object to invoke a method to run the corresponding test, to result in a plurality of objects corresponding to the plurality of test names;

instructions to use a first object in the plurality of objects to run a first test in the corresponding plurality of tests, by executing a first database query to invoke a first method to run the first test;

instructions to prepare and execute an additional database query to invoke an additional interface procedure defined in the first test, wherein the additional interface procedure automatically stores, in a runtime store accessible to the plurality of objects, an array of name-value pairs, each name-value pair comprising a name of an output parameter of the first test and a value of the output parameter; and instructions to use a second object in the plurality of objects to run a second test in the corresponding plurality of tests, by preparing and executing a second database query to invoke a second method to run the second test, while supplying at least one value from the runtime store as an input parameter to the second test if the name of the output parameter of the first test is identical to a name of the input parameter of the second test.

8. The one or more non-transitory computer-readable storage media of claim 7 further comprising:

instructions to use a third object in the plurality of objects to run a third test in the corresponding plurality of tests, while supplying from the runtime store at least a second value as an input parameter to the third test, if a second name corresponding to the second value is identical to a third name of said input parameter of the third test.

9. The one or more non-transitory computer-readable storage media of claim 7 wherein:

at least one test in the corresponding plurality of tests is expressed in an object oriented language.

10. The one or more non-transitory computer-readable storage media of claim 7 wherein:

at least one test in the corresponding plurality of tests is expressed in the DBMS procedural language.

11. A computer-implemented method of executing tests, the method comprising:

automatically creating, for at least a first test name in a plurality of test names, a first object to invoke a first method of a predetermined name to run a first test in a plurality of tests, wherein the first object is comprised among a plurality of objects corresponding to the plurality of test names;

automatically using the first object to run the first test, by executing a database query to invoke said first method to run the first test;

automatically executing an additional database query to invoke an interface procedure defined in the first test, the interface procedure having an additional predetermined name, wherein the interface procedure automatically stores, in a runtime store accessible to the plurality of objects, an array of name-value pairs, each name-value pair comprising a name of an output parameter of the first test and a value of the output parameter; and automatically using a second object in the plurality of objects to run a second test in the corresponding plurality of tests, while supplying from the runtime store at least a first value output by the first test as a value of an input parameter to the second test, if a first name corresponding to the first value is identical to a second name of the input parameter of the second test.

12. The computer-implemented method of executing tests of claim 11 wherein:

at least one test in the corresponding plurality of tests is expressed in an object oriented language.

13. The computer-implemented method of executing tests of claim 12 wherein:

the object oriented language comprises Java.

14. The computer-implemented method of executing tests of claim 11 wherein:

the plurality of test names are comprised in a container test; and prior to said automatically creating, the computer-implemented method of executing tests further comprises executing an initial database query to invoke another procedure defined in the container test to obtain an array comprising the plurality of test names.

15. The computer-implemented method of executing tests of claim 11 wherein further comprising:

executing another database query to invoke a second method to run the second test.

16. The computer-implemented method of executing tests of claim 11 further comprising:

automatically using a third object in the plurality of objects to run a third test in the corresponding plurality of tests, while supplying from the runtime store at least a second value as an input parameter to the third test, if a second name corresponding to the second value is identical to a third name of said input parameter of the third test.

17. A computer configured to execute tests, the computer comprising:

means for automatically preparing and executing an initial database query to invoke an initial interface procedure defined in a container test;

means, coupled to the means for automatically preparing and executing, for automatically using an output of the initial interface procedure to create an array of a plurality of test names;

means, coupled to the means for automatically using, for automatically creating, for each test name in the array, an object to invoke a method to run a corresponding test, thereby resulting in a plurality of objects corresponding to the plurality of test names;

means, coupled to the means for automatically creating, for automatically using a first object in the plurality of objects to run a first test in the corresponding plurality of tests, by executing a first database query to invoke said method to run the first test;

means, coupled to all aforesaid means, for automatically preparing and executing an additional database query to invoke an additional interface procedure defined in the first test, wherein the additional interface procedure automatically stores, in a runtime store accessible to the plurality of objects, an array of name-value pairs, each name-value pair comprising a name of an output parameter of the first test and a value of the output parameter.

18. The computer of claim 17 further comprising:

means for using a third object in the plurality of objects to run a third test in the corresponding plurality of tests, while supplying from the runtime store at least a second value as an input parameter to the third test, if a second name corresponding to the second value is identical to a third name of said input parameter of the third test.

19. The computer of claim 17 further comprising:

means for executing another database query to invoke a second method to run the second test.

20. The computer of claim 17 wherein:

at least one test in the plurality of tests is expressed in an object oriented language.

21. One or more non-transitory computer-readable storage media comprising instructions, said instructions comprising:

instructions to create, for at least a first test name in a plurality of test names, a first object to invoke a first method of a predetermined name to run a first test in a plurality of tests, wherein the first object is comprised among a plurality of objects corresponding to the plurality of test names;

instructions to use the first object to run the first test, by executing a database query to invoke said first method to run the first test;

instructions to execute an additional database query to invoke an interface procedure defined in the first test, the interface procedure having an additional predetermined name, wherein the interface procedure automatically stores, in a runtime store accessible to the plurality of objects, an array of name-value pairs, each name-value pair comprising a name of an output parameter of the first test and a value of the output parameter; and instructions to use a second object in the plurality of objects to run a second test in the corresponding plurality of tests, while supplying from the runtime store at least a first value output by the first test as a value of an input parameter to the second test, if a first name corresponding to the first value is identical to a second name of the input parameter of the second test.

22. The one or more non-transitory computer-readable storage media of claim 21 wherein:

at least one test in the plurality of tests is expressed in an object oriented language.

23. The one or more non-transitory computer-readable storage media of claim 21 wherein:

the plurality of test names are comprised in a container test; and the one or more non-transitory computer-readable storage media further comprise instructions to execute an initial database query to invoke another procedure defined in the container test to obtain an array comprising the plurality of test names.

24. The one or more non-transitory computer-readable storage media of claim 21 further comprising:

instructions to execute another database query to invoke a second method to run the second test.

25. The one or more non-transitory computer-readable storage media of claim 21 further comprising:

instructions to use a third object in the plurality of objects to run a third test in the corresponding plurality of tests, while supplying from the runtime store at least a second value as an input parameter to the third test, if a second name corresponding to the second value is identical to a third name of said input parameter of the third test.

26. A computer configured to execute tests, the computer comprising:

means for creating, for at least a first test name in a plurality of test names, a first object to invoke a first method of a predetermined name to run a first test in a plurality of tests, wherein the first object is comprised among a plurality of objects corresponding to the plurality of test names;

means for using the first object to run the first test, by executing a database query to invoke said first method to run the first test;

means for executing an additional database query to invoke an interface procedure defined in the first test, the interface procedure having an additional predetermined name, wherein the interface procedure automatically stores, in a runtime store accessible to the plurality of objects, an array of name-value pairs, each name-value pair comprising a name of an output parameter of the first test and a value of the output parameter; and means for using a second object in the plurality of objects to run a second test in the corresponding plurality of tests, while supplying from the runtime store at least a first value output by the first test as a value of an input parameter to the second test, if a first name corresponding to the first value is identical to a second name of the input parameter of the second test.

27. The computer of claim 26 wherein:

at least one test in the plurality of tests is expressed in an object oriented language.

28. The computer of claim 26 wherein:

the plurality of test names are comprised in a container test; and the computer further comprises means for executing an initial database query to invoke another procedure defined in the container test to obtain an array comprising the plurality of test names.

29. The computer of claim 26 further comprising:

means for executing another database query to invoke a second method to run the second test.

30. The computer of claim 26 further comprising:

means for using a third object in the plurality of objects to run a third test in the corresponding plurality of tests, while supplying from the runtime store at least a second value as an input parameter to the third test, if a second name corresponding to the second value is identical to a third name of said input parameter of the third test.

* * * * *

UNITED STATES PATENT AND TRADEMARK OFFICE

CERTIFICATE OF CORRECTION

PATENT NO. : 7,836,431 B2
APPLICATION NO. : 11/656586
DATED : November 16, 2010
INVENTOR(S) : Minyi Xu It is certified that error appears in the above-identified patent and that said Letters Patent is hereby corrected as shown below:

In column 12, line 18-19, delete “getDeafaultTestParams” and insert -- getDefaultTestParams --, therefor.

In column 15, line 4, delete “interace” and insert -- interface --, therefor.

In column 15, line 8, delete “interace” and insert -- interface --, therefor.

In column 15, line 12, delete “interace” and insert -- interface --, therefor.

In column 15, line 15, delete “interace” and insert -- interface --, therefor.

In column 15, line 30, delete “interace” and insert -- interface --, therefor.

In column 15, line 35, delete “interace” and insert -- interface --, therefor.

In column 15, line 38, delete “interace” and insert -- interface --, therefor.

In column 18, line 9, in claim 15, after “claim 11” delete “wherein”.

Signed and Sealed this
Second Day of August, 2011

David J. Kappos

David J. Kappos
*Director of the United States Patent and Trademark Office*